United States Patent
Biegelsen et al.

(10) Patent No.: US 12,172,209 B2
(45) Date of Patent: Dec. 24, 2024

(54) PRINTER JETTING MECHANISM AND PRINTER EMPLOYING THE PRINTER JETTING MECHANISM

(71) Applicant: XEROX CORPORATION, Norwalk, CT (US)

(72) Inventors: David K. Biegelsen, Portola Valley, CA (US); Robert Anthony Street, Palo Alto, CA (US)

(73) Assignee: XEROX CORPORATION, Norwalk, CT (US)

( * ) Notice: Subject to any disclaimer, the term of this patent is extended or adjusted under 35 U.S.C. 154(b) by 56 days.

(21) Appl. No.: 17/448,997

(22) Filed: Sep. 27, 2021

(65) Prior Publication Data

US 2023/0098918 A1      Mar. 30, 2023

(51) Int. Cl.
   *B22D 23/00*      (2006.01)
   *B22F 12/53*      (2021.01)
   *B33Y 30/00*      (2015.01)

(52) U.S. Cl.
   CPC ............ *B22D 23/003* (2013.01); *B22F 12/53* (2021.01); *B33Y 30/00* (2014.12)

(58) Field of Classification Search
   None
   See application file for complete search history.

(56) References Cited

U.S. PATENT DOCUMENTS

| | | | |
|---|---|---|---|
| 4,925,103 | A | 5/1990 | Muench et al. |
| 5,245,244 | A | 9/1993 | Takahashi et al. |

(Continued)

FOREIGN PATENT DOCUMENTS

| | | | |
|---|---|---|---|
| WO | WO-2007038987 A1 * | 4/2007 | ............. B22F 3/115 |
| WO | 2013/050250 A1 | 4/2013 | |
| WO | 2017/089176 A1 | 6/2017 | |

OTHER PUBLICATIONS

Ansell, T.Y. Current Status of Liquid Metal Printing. J. Manuf. Mater. Process. 2021, 5, 31. https://doi.org/10.3390/jmmp5020031 (Year: 2021).*

(Continued)

*Primary Examiner* — Paul A Wartalowicz
*Assistant Examiner* — Catherine P Smith
(74) *Attorney, Agent, or Firm* — MH2 Technology Law Group LLP

(57) ABSTRACT

A three-dimensional ("3D") printer. The 3D printer comprises: a feeder mechanism for advancing a print material; a plurality of ejector conduits arranged in an array, each ejector conduit comprising a first end positioned to accept the print material from the feeder mechanism, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; a current pulse generating system in electrical contact with the ejector nozzle of each of the plurality of ejector conduits, the current pulse generating system being configured to flow an electrical current between the first electrode and the second electrode to provide sufficient thermal expansion so as to eject an electrically conductive print material in the event the electrically conductive print material is positioned in the ejector nozzle; and a positioning system for controlling the relative position of the array with respect to a print substrate in a manner that would allow the print substrate to receive print material jettable from the ejector nozzle of each of the plurality of ejector conduits during operation of the 3D printer.

31 Claims, 13 Drawing Sheets

(56) References Cited

U.S. PATENT DOCUMENTS

| | | | |
|---|---|---|---|
| 5,261,611 A | 11/1993 | Huxford | |
| 5,276,419 A | 1/1994 | Griffin et al. | |
| 5,377,961 A | 1/1995 | Smith et al. | |
| 5,649,992 A | 7/1997 | Carter, Jr. et al. | |
| 5,779,971 A | 7/1998 | Tsung Pan et al. | |
| 6,202,734 B1* | 3/2001 | Sackinger | B22F 9/14 |
| | | | 164/46 |
| 6,378,743 B1 | 4/2002 | Kagan | |
| 8,444,028 B2 | 5/2013 | Rasa et al. | |
| 8,721,032 B2 | 5/2014 | Kuznetsov et al. | |
| 9,168,549 B2 | 10/2015 | Slot | |
| 9,198,299 B2 | 11/2015 | Ulmer et al. | |
| 9,456,502 B2 | 9/2016 | Rasa | |
| 9,616,494 B2 | 4/2017 | Vader et al. | |
| 10,052,689 B2 | 8/2018 | Rasa | |
| 10,195,665 B2 | 2/2019 | Sachs et al. | |
| 10,543,532 B2 | 1/2020 | Sachs et al. | |
| 10,974,320 B2 | 4/2021 | Pan et al. | |
| 11,241,833 B2 | 2/2022 | Gandhiraman et al. | |
| 11,813,672 B2 | 11/2023 | Holcomb et al. | |
| 2004/0217186 A1* | 11/2004 | Sachs | B33Y 30/00 |
| | | | 239/11 |
| 2007/0097180 A1 | 5/2007 | Carlson et al. | |
| 2011/0233239 A1* | 9/2011 | Rasa | B23K 3/0607 |
| | | | 222/591 |
| 2011/0285792 A1 | 11/2011 | Byun et al. | |
| 2014/0217134 A1 | 8/2014 | Rasa | |
| 2014/0322451 A1 | 10/2014 | Barton et al. | |
| 2015/0273577 A1 | 10/2015 | Vader et al. | |
| 2015/0336170 A1 | 11/2015 | Wagstaff et al. | |
| 2016/0082654 A1 | 3/2016 | Hakkaku | |
| 2016/0107441 A1 | 4/2016 | Joppen et al. | |
| 2016/0236411 A1 | 8/2016 | Ohnishi | |
| 2016/0256888 A1 | 9/2016 | Rasa et al. | |
| 2016/0346998 A1 | 12/2016 | Mark et al. | |
| 2016/0361763 A1 | 12/2016 | Batchelder et al. | |
| 2017/0028467 A1 | 2/2017 | Rasa | |
| 2017/0056966 A1 | 3/2017 | Myerberg et al. | |
| 2017/0087632 A1 | 3/2017 | Mark | |
| 2017/0252829 A1* | 9/2017 | Sachs | B33Y 50/02 |
| 2017/0355138 A1 | 12/2017 | Mark | |
| 2018/0009223 A1* | 1/2018 | Poulikakos | B41J 2/1433 |
| 2018/0141119 A1 | 5/2018 | Shu et al. | |
| 2019/0061349 A1* | 2/2019 | Kanaris | B41J 2/175 |
| 2019/0143449 A1 | 5/2019 | Zenou | |
| 2019/0255615 A1* | 8/2019 | Liang | B22F 3/003 |
| 2019/0375003 A1 | 12/2019 | Mark | |
| 2020/0033751 A1* | 1/2020 | Matsumoto | G03G 15/086 |
| 2020/0258717 A1* | 8/2020 | Gandhiraman | B29C 64/209 |
| 2020/0324486 A1 | 10/2020 | Mantell et al. | |
| 2020/0346281 A1 | 11/2020 | Hosek | |
| 2020/0376760 A1* | 12/2020 | Bruggeman | B33Y 50/02 |
| 2021/0070043 A1* | 3/2021 | Tse | B41J 2/072 |
| 2021/0162493 A1 | 6/2021 | Herrmann et al. | |
| 2021/0178763 A1* | 6/2021 | Chungbin | B22D 23/003 |
| 2021/0237424 A1 | 8/2021 | Hara et al. | |
| 2021/0245438 A1 | 8/2021 | Xiao | |
| 2021/0323053 A1 | 10/2021 | Gibson et al. | |
| 2022/0062983 A1* | 3/2022 | Schmitt | B22F 12/13 |
| 2022/0168817 A1 | 6/2022 | Sambhy et al. | |
| 2022/0184948 A1* | 6/2022 | Wong | B41J 2/175 |
| 2022/0347749 A1 | 11/2022 | Subramanian | |

OTHER PUBLICATIONS

Biegelsen, D.K., "Printer Jetting Mechanism and Printer Employing the Printer Jetting Mechanism," U.S. Appl. No. 17/448,981, filed Sep. 27, 2021.

Biegelsen, D.K., "Method of Jetting Print Material and Method of Printing," U.S. Appl. No. 17/448,991, filed Sep. 27, 2021.

Biegelsen, D.K., et al., "Method of Jetting Print Material and Method of Printing," U.S. Appl. No. 17/449,006, filed Sep. 27, 2021.

Biegelsen, D.K., "Printer Jetting Mechanism and Printer Employing the Printer Jetting Mechanism," U.S. Appl. No. 17/449,019, filed Sep. 27, 2021.

Biegelsen, D.K., "Method of Jetting Print Material and Method of Printing," U.S. Appl. No. 17/449,021, filed Sep. 27, 2021.

Biegelsen, D.K., et al., "Printer Jetting Mechanism and Printer Employing the Printer Jetting Mechanism," U.S. Appl. No. 17/449,028, filed Sep. 27, 2021.

Biegelsen, D.K., et al., "Ejector Device, 3D Printer Employing the Ejector Device and Method of 3D Printing," U.S. Appl. No. 17/449,043, filed Sep. 27, 2021.

Biegelsen, D.K., et al., "Method of Jetting Print Material Using Ejector Devices and Methods of Making the Ejector Devices," U.S. Appl. No. 17/449,046, filed Sep. 27, 2021.

Author Unknown, "Chapter 12—Magnetism and Magnetic Circuits," date unknown, 14 pages.

Author Unknown, "MACOR—Machinable Glass Ceramic for Industrial Applications," date unknown, 6 pages.

Prime Faraday Partnership, "An Introduction to MEMS," published in 2002, Wolfson School of Mechanical and Manufacturing Engineering Loughborough University, 56 pages.

* cited by examiner

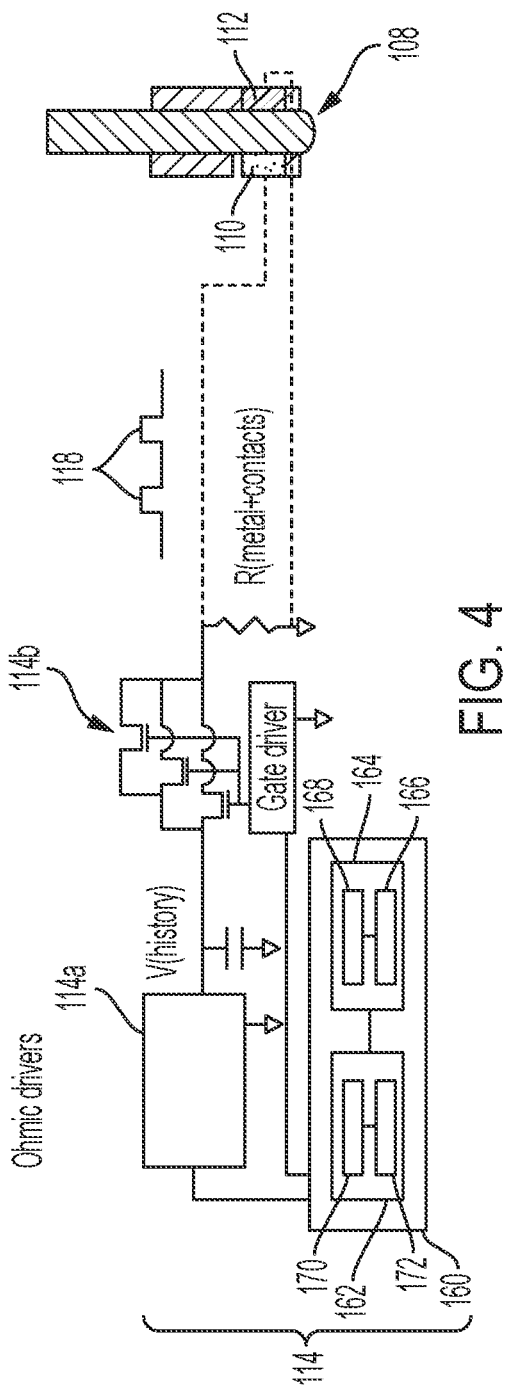
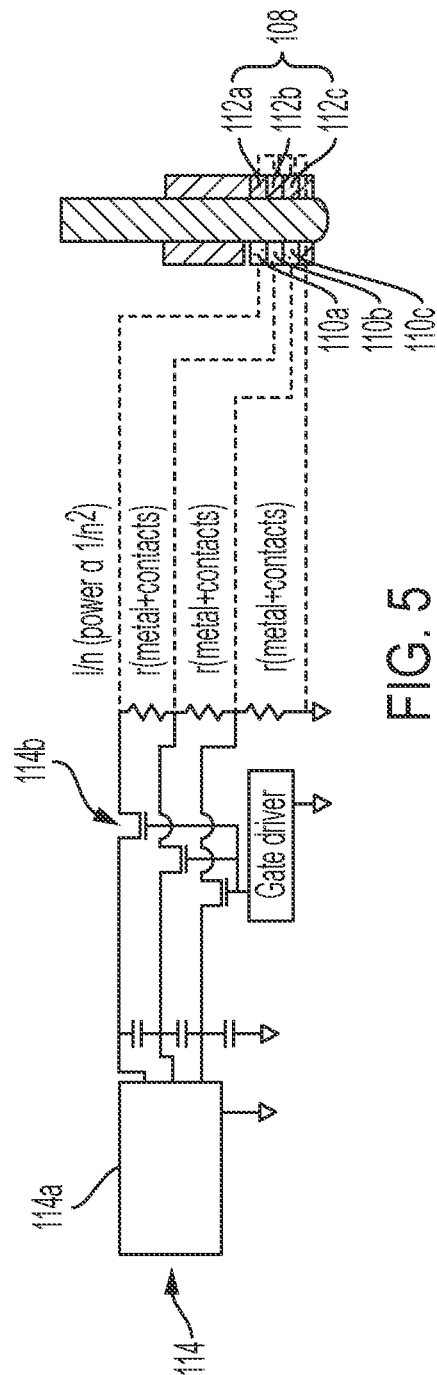
FIG. 4
FIG. 5

PRINTER JETTING MECHANISM AND PRINTER EMPLOYING THE PRINTER JETTING MECHANISM

DETAILED DESCRIPTION

Field of the Disclosure

The present disclosure is directed to a printer jetting mechanism that can be employed in printers used for additive manufacturing (referred to herein as three-dimensional ("3D") printers).

Background

Melting of solid materials, including materials in the form of solid filaments, is commonly used in 3D printing techniques. It is well understood that when phase change or heating of a material occurs, the material generally expands and, in the case of phase change from solid to liquid, becomes flowable. Print materials are often melted to allow flow of the material and deposition onto a substrate in order to form a 3D object therefrom. As a specific example, liquid three-dimensional printers for building 3D objects from molten aluminum are known in the art.

One such 3D printer is disclosed in U.S. Pat. No. 9,616,494. The 3D printer works by using DC pulses applied by an electromagnetic coil to expel molten aluminum drops in response. A platen to which the drops are targeted translates to allow for the drops to be connected and built up to produce a three-dimensional object. However, drops of molten aluminum ejected from this 3D printer have diameters of ~0.5 mm or larger. This enables high volume throughput metal part fabrication. However, the relatively large drop size can result in an undesirable degree of porosity of 3D objects printed thereby, as well as uneven build surfaces during fabrication, unwelded drops, and shape inconsistencies. All of these potentially lead to degraded physical properties such as poor tensile strength, as well as poor appearance issues with the final object and/or the inability to print objects with very fine details.

Therefore, methods and systems for improving the quality of three-dimensional objects made from three-dimensional printers, such as, for example, liquid metal printers, would be a step forward in the art.

SUMMARY

An embodiment of the present disclosure is directed to a three-dimensional ("3D") printer. The 3D printer comprises: a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; a current pulse generating system in electrical contact with the ejector nozzle of each of the plurality of ejector conduits, the current pulse generating system being configured to flow an electrical current between the first electrode and the second electrode to provide sufficient thermal expansion so as to eject an electrically conductive print material in the event the electrically conductive print material is positioned in the ejector nozzle; and a positioning system for controlling the relative position of the array with respect to a print substrate in a manner that would allow the print substrate to receive print material jettable from the ejector nozzle of each of the plurality of ejector conduits during operation of the 3D printer.

The present disclosure is also directed to a printer jetting mechanism. The printer jetting mechanism comprises: a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway; and a current pulse generating system in electrical contact with the ejector nozzle of each of the plurality of ejector conduits, the current pulse generating system being configured to flow an electrical current between the first electrode and the second electrode to provide sufficient thermal expansion so as to eject an electrically conductive print material in the event the electrically conductive print material is positioned in the ejector nozzle.

Another embodiment of the present disclosure is directed to a three-dimensional ("3D") printer jetting mechanism. The 3D printer jetting mechanism comprises a plurality of ejector conduits arranged in an array, each ejector conduit comprising a first end positioned to accept a print material, a second end comprising an ejector nozzle, and a passageway defined by an inner surface of the ejector conduit for allowing the print material to pass through the ejector conduit from the first end to the second end. The ejector nozzle comprising a first electrode, a second electrode and an electrically insulating material laterally disposed between the first electrode and the second electrode, at least one surface of the first electrode being exposed in the passageway and at least one surface of the second electrode being exposed in the passageway.

Another embodiment of the present disclosure is directed to a method of printing a three-dimensional object. The method comprises: supplying a print material that is electrically conductive to a plurality of ejector conduits arranged in an array, the ejector conduits comprising first ends configured to accept the print material and second ends comprising ejector nozzles; advancing the print material in one or more of the ejector conduits of the array until the print material is disposed in the ejector nozzle of the one or more ejector conduits; flowing electrical current through the print material positioned in at least one of the ejector nozzles, thereby heating and expanding the print material in the at least one of the ejector nozzles so as to eject at least a portion of the print material from the at least one of the ejector nozzles onto a print substrate; and repeating both the advancing and the flowing electrical current through the print material to form a three-dimensional object on the print substrate.

Yet another embodiment of the present disclosure is directed to a method for jetting print material from a printer jetting mechanism. The method comprises: supplying a print material that is electrically conductive to a plurality of ejector conduits arranged in an array, the ejector conduits comprising first ends configured to accept the print material and second ends comprising ejector nozzles; advancing the print material in one or more of the ejector conduits of the array until the print material is disposed in the ejector nozzle of the one or more ejector conduits; and flowing electrical current through the print material positioned in at least one of the ejector nozzles, thereby heating and expanding the print material in the at least one of the ejector nozzles so as to eject at least a portion of the print material from the at least one of the ejector nozzles.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

FIG. 4 illustrates an example of a schematic cross-sectional view of an ejector conduit. A current pulse generating system is also illustrated that can be employed to generate a current pulse across electrodes positioned in an ejector nozzle of the ejector conduit, according to an embodiment of the present disclosure.

FIG. 5 illustrates an example of a schematic cross-sectional view of an ejector conduit. A current pulse generating system is also illustrated can be employed to generate a current pulse across electrodes positioned in an ejector nozzle of the ejector conduit, according to an embodiment of the present disclosure.

Figure 1:
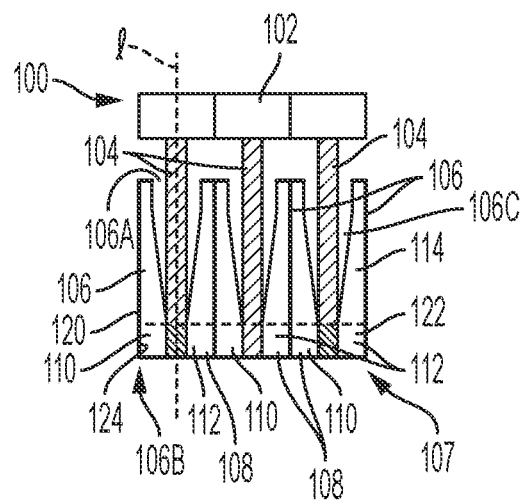
FIG. 1 illustrates an example of a printer jetting mechanism, according to an embodiment of the present disclosure.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

The present disclosure is directed to a printer jetting mechanism comprising a plurality of ejector conduits arranged in a jet array, as well as 3D printers employing the printer jetting mechanism. Methods of employing such jetting mechanisms for jetting a print material are also disclosed. The printer jetting mechanism is designed to employ an electrical current to induce a thermal expansion of the print material as the force for jetting, as will be described in greater detail herein. The jetting mechanisms and methods of printing disclosed herein can provide one or more of the following advantages: the ability to selectively jet a wide range of metals and other materials; the ability to jet selectable droplet volumes; the ability to jet small droplet sizes that enable printing of fine and/or selectable feature sizes; and the ability to print at relatively high throughputs.

Printer Jetting Mechanism

Figure 2:
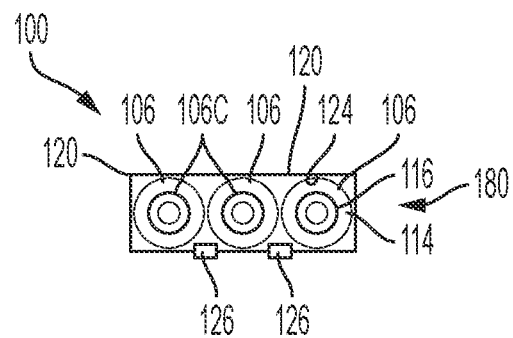
FIG. 2 illustrates a top view of a printer jetting mechanism, according to an example of the present disclosure.

FIG. 1 illustrates an example of a printer jetting mechanism 100, according to an embodiment of the present disclosure. The printer jetting mechanism 100 optionally comprises a feeder mechanism 102 for advancing a print material 104 to be printed. Exemplary printing materials 104 are pre-formed wires of selected alloys, or other materials as will be discussed in greater detail below. A plurality of ejector conduits 106 are arranged in an array 107. Each ejector conduit 106 comprises a first end 106A positioned to accept the print material 104 from the feeder mechanism 102. A second end 106B comprises an ejector nozzle 108. FIG. 2 illustrates a top view of the printer jetting mechanism 100. A passageway 106C defined by an inner surface of each of the ejector conduits 106 allows the print material 104 to pass through the ejector conduits 106 from the first end 106A to the second end 106B.

Figure 3:
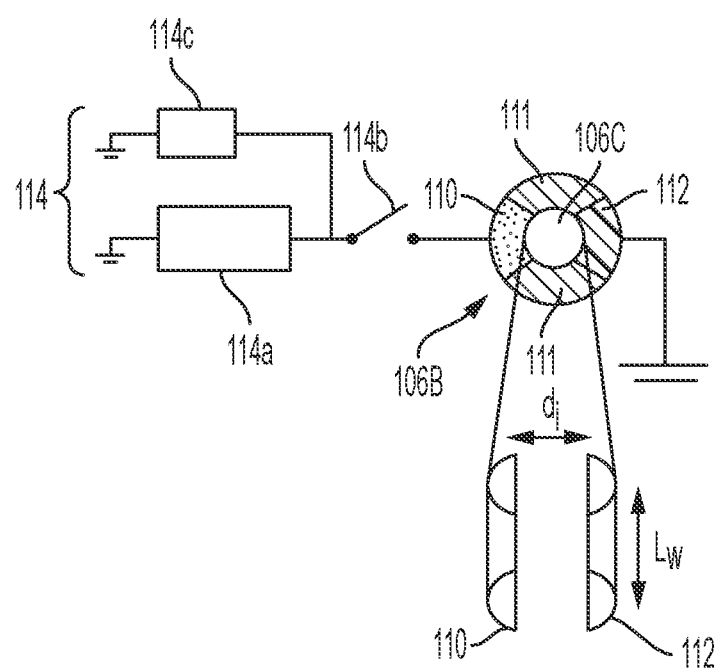
FIG. 3 illustrates a bottom view of an ejector nozzle comprising an electrode pair. A current pulse generating system is illustrated in electrical contact with the electrode pair, according to an embodiment of the present disclosure.

The ejector nozzles 108 comprise at least one pair of electrodes, including a first electrode 110 and a second electrode 112, that are used to supply electrical current to heat the print material 104. At least one surface of the first electrode 110 is exposed in the passageway 106C and at least one surface of the second electrode 112 is exposed in the passageway 106C. A current pulse generating system 114, shown in FIG. 3, is in electrical contact with the at least one electrode pair of the ejector nozzle 108 of each of the plurality of ejector conduits 106. The current pulse generating system 114 is capable of causing a pulse of current to flow predominantly between the first electrode 110 and the second electrode 112 when an electrically conductive print material 104 is positioned in the ejector nozzle 108.

Sufficient power is provided to electrodes 110, 112 to heat print material 104 in the ejector nozzles 108 and cause the print material 104 to expand sufficiently rapidly so as to provide sufficient momentum to eject, or jet, at least a portion of the print material from the ejector nozzles 108. The rapid expansion of the print material that results in the desired ejection of the print material, also referred to herein as jetting, may or may not include heating to cause a phase change of the print material, as will be described in greater detail below.

Electrodes 110 and 112 can be configured to provide electrical contact with the print material 104. As an example, if the print material is a solid filament, one or both of electrodes 110, 112 can be lightly sprung using any desired spring mechanism 113 (FIG. 7) or electrode design that will positionally bias one or both of the electrodes in the direction of the longitudinal axis, $\ell$, of the passageway 106C. In this manner, the electrode(s) are forced against the print material 104 when the print material 104 is fed into the nozzle 108 during operation of the ejector. Suitable spring mechanisms and/or electrode designs that can provide such a biased contact force against the filament can be determined by one of ordinary skill in the art.

The electrodes 110, 112 can comprise any material suitable for providing electrical contact to the print material 104 while withstanding ejector nozzle temperatures during printing. Examples of suitable materials include metals with higher melting temperatures than the print material, including refractory metals as described herein, aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, silver and silver alloys. Suitable alloys of the above named metals can comprise mixtures of any desired metals, such as mixtures of two or more of any of the above named elemental metals, including the elemental refractory metals, such as, for example, mixtures of two or more of aluminum, magnesium, iron, copper, nickel, titanium, tungsten or any of the other elemental refractory metals, palladium, silver, any of the other refractory metal alloys listed herein, and so forth. The electrodes 110 and 112 can be corrosion resistant. For example, any of the electrodes 110 and 112 described herein are optionally coated with a passivation coating 144 (e.g., FIG. 7) comprising a noble metal, such as palladium, that resists corrosion by the molten print material. In an example, any of the electrodes herein can comprise tungsten, another refractory metal, copper or any of the other metals taught herein as being suitable for electrodes and are coated with a passivation layer comprising a noble metal, such as palladium. Employing noble metals as corrosion resistant coatings on electrodes is generally well known.

The current pulse generating system 114, which is also referred to herein as a current pulse generating circuit, has the capacity to generate a pulse of current with sufficient amplitude to heat and expand the print material 104 in a relatively short period of time (e.g., a single current pulse). The short, high power current pulse creates sufficient momentum of the heated print material, arising from the thermally driven expansion, to cause detachment and ejection of the print material 104 from the ejector nozzle 108 during operation of, for example, a 3D printer. This can occur without employing a magnetic field source, such as an electromagnetic coil or other type of magnet, in conjunction with the current pulse to generate the ejection force. Thus, in the present application, it is the expansion of the print material that primarily drives the ejection, rather than an electromagnetic force.

Any type of current pulse generating circuit that can provide a pulse of sufficient amperage to achieve the desired heating rate for thermal expansion and ejection of the print material can be employed. Suitable current pulse generating circuits are well known in the art and any desired current pulse generating system can be employed. The current pulse generating system is in electrical connection with one or more of any of the electrode pairs (e.g., all of the electrode pairs) in the ejector devices described herein, such as the first electrode 110 and second electrode 112 of the ejector nozzle, as shown, for example, in FIGS. 3, 4 and 5. In an embodiment, the current pulse generating system 114 comprises a current source in electrical connection with the ejector nozzle 108 (e.g., the current source connected to the first electrode 110 and a current sink in electrical connection with the second electrode 112 of the ejector nozzle). In another embodiment, the current pulse generating system 114 comprises a voltage source in electrical connection with the ejector nozzle 108 (e.g., so as to apply a desired voltage between the first electrode 110 and the second electrode 112 of the nozzle). Examples of suitable current sources and voltage sources are well known in the art.

Referring to FIG. 3, a circuit of the current pulse generating system 114 can comprise a power supply 114a and a switch 114b operated by a pulse control device 114c, such as a pulse generator, waveform generator or other device capable of generating the desired current pulses. While they are shown separately in FIG. 3, the switch 114b may optionally be part of the pulse control device 114c. The pulse control device 114c can be programmable so as to provide for computer control of the current pulse generating system. The power supply 114a can be any power supply, such as a DC power supply or switching power supply, able to supply the desired current. The switch 114b can be any switch capable of providing the desired current pulse in conjunction with the pulse control device 114c. Examples include high current capable switches, including FETs or MEMS switches. Other circuit components can optionally be included as part of the current pulse generating system 114, such as amplifiers, resistors and so forth, as would be understood by one of ordinary skill in the art. The current pulse generating system 114 can be electrically connected to the print material in ejector nozzle 108 using electrodes 110 and 112, as described herein.

FIG. 4 illustrates an example of a current pulse generating circuit that can potentially be employed to provide a relatively high current pulse over a small duration of time at a low duty cycle. The current pulse generating system 114 of FIG. 4 employs a power supply 114a, which is a DC power supply, such as a switching power supply, and a plurality of FETS (e.g., GaAs FETS or other FETS) that act as switches 114b, to charge one or more capacitors. The current pulse generating system 114 of FIG. 4 is electrically connected to the print material in ejector nozzle 108 using electrodes 110 and 112, as described herein. The charged capacitor(s) can be discharged to provide the desired current pulse 118 across the print material. General circuit designs can employ DC voltage supplies, high power operational amplifiers with a current feedback resistor, and/or fast, low series-impedance switches, such as GaAs nMOS transistors. Such circuits are generally well known. Rapid bipolar switching can be similarly applied using, for example, high current H-bridges. Any other suitable current pulse generating circuit capable of providing suitable current pulses can be employed.

The resistivity of the print material will vary as it is heated and/or changes phase, which can be taken into account when determining the desired amplitude and/or duration of the current pulse. If desired, the amount of current supplied by the current pulse generating system 114 can be intentionally varied over the duration of the current pulse 118 in order to provide the desired thermal energy to the print material despite changes in resistivity that may occur due to heating and/or phase change of the print material 104.

In an embodiment, the current pulse generating system 114 comprises a pulse control device that is programmable. Pulse control system 160 (FIG. 4) is an example of a programmable pulse control device that comprises a pulse controller 162 and a computation system 164. The pulse controller 162 can be, for example, a microcontroller comprising a CPU 170 and memory 172 that interfaces with the circuit components (e.g., a current switch, power supply and/or other components) of the current pulse generating system 114 to generate current pulses having the desired pulse characteristics for heating the print material when the current pulse is flowed between the first electrode 110 and second electrode 112. The pulse controller 162 can be driven by the computational system 164, which is capable of carrying out computer executable instructions embedded in a non-transitory computer readable medium (e.g., the memory 166 of the computation system 164). The computation system 164 can be integrated as part of the pulse controller 162 itself (e.g., can employ a CPU and memory integrated into the pulse controller 162, such as CPU 170 and memory 172) or can be a separate computer system (as shown in FIG. 4), including, for example, the memory 166 and a CPU 168, that interfaces with the pulse controller 162. The computer executable instructions embedded in the non-transitory computer readable medium of the computation system 164 can, among other things, instruct the CPU 168 of the computation system 164 to determine at least one desired pulse characteristic such as pulse length, amplitude and/or pulse shape for heating the print material to cause thermal expansion and ejection of the print material 104 as described herein. The computation system 164 can determine the at least one desired pulse characteristics in any suitable manner, such as by using mathematical algorithms to calculate the pulse characteristics that will provide the desired ejection characteristics of the print material 104, and may, for example, take into account such things as the type of print material, pulse history of the ejector and/or feedback from the printer jetting mechanism. Such feedback can include, for example, real time nozzle temperature, print material temperature and/or other data. Additional computer executable instructions embedded in the non-transitory computer readable medium (e.g., memory 166 or 172) of one or both of the computation system 164 and pulse controller 162, are executed by a CPU of the pulse control system 160 (e.g., CPU 168 and/or CPU 170) to send instructions or electrical signals for causing the voltage source or current source of the current pulse generating system to flow an electrical current between the first electrode 110 and the second electrode 112. The resulting electrical current comprises a current pulse 118 having the at least one pulse characteristic. By controlling the current pulses across the first electrode 110 and second electrode 112, the ejection of the print material 104 can be controlled, including such things as droplet volume, velocity of the ejected print material and ejection rate (e.g., number of ejections per second).

As described above, when determining the desired pulse characteristics, the computation system 164 can optionally compensate for such things as the effect on conductivity, thermal expansion or other temperature dependent properties of the print material 104 due to, for instance, the temperature changes at the nozzle 108 caused by changes in duty cycle. For example, in some cases, duty cycle may be high, one pulse quickly following another. This can potentially cause the ejector nozzles 108, the ejector conduits 106 proximate the ejector nozzle and/or the print material 104 contained therein to locally rise in temperature compared to a lower duty cycle situation. Such temperature changes can have effects on print material expansion and ejection. By accounting for these effects when determining pulse characteristics, the computation system 164 of the current pulse generating system can control and/or improve the ejection characteristics of the printer jetting mechanism 100.

FIG. 5 illustrates a current pulse generating circuit similar to that of FIG. 4, except that the current pulse generating circuit of FIG. 5 can be employed with an ejector nozzle 108 comprising more than one pair of electrodes 110a,112a; 110b,112b and 110c, 112c. While three pairs of electrodes are shown, any number of electrode pairs can be employed, such as 1 to 10 electrode pairs, or 2 to 5 electrode pairs. Such a design may potentially allow for improved control and/or higher current density through the print material as compared with the single electrode pair design of FIG. 4. For example, multiple electrodes per nozzle can enable variable volume droplet ejection, where the droplet volume for each ejection can be varied by sending current pulses to a desired number of electrode pairs. Thus, a smaller droplet can be ejected by pulsing current through a single electrode pair 110a, 112a; while larger droplets can be ejected by pulsing current through two electrode pairs 110a, 112a and 110b, 112b, or 3 or more electrode pairs. A pulse control system 160, such as that illustrated in FIG. 4 can also be employed for controlling the current pulse generating circuit of FIG. 5. Any of the devices of the present disclosure can employ multiple electrode pairs in the ejector nozzle(s) 108, as described herein.

Figure 6:
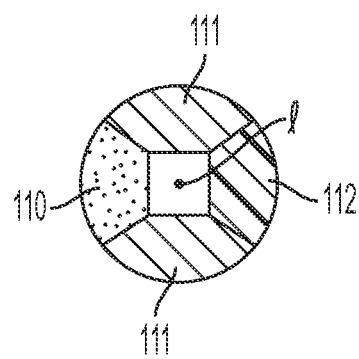
FIG. 6 illustrates a schematic bottom view of an ejector nozzle having a flow path with a square cross-section, according to an embodiment of the present disclosure.
Figure 7:
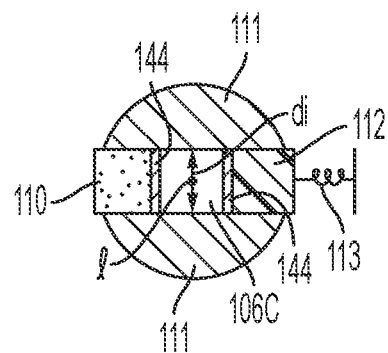
FIG. 7 illustrates a schematic bottom view of an ejector nozzle having a flow path with a square cross-section, according to an embodiment of the present disclosure.

The ejector nozzles 108 are end portions of the ejector conduits 106 and are positioned to eject print material during operation of the printer jetting mechanism 100. The passageway 106C of the ejector nozzle 108 can have a shape that is the same or different than the shape of the passageway 106C of the ejector conduit 106. FIG. 3 shows an ejector nozzle 108 with a passageway 106C that has a circular cross-section bounded by electrodes 110, 112 and an electrical insulator portion 111 laterally disposed between the electrodes 110 and 112. The electrical insulator comprises an insulating material, such as, for example, silica or any of the other insulating materials described herein as being suitable for ejector conduits 106. Examples of ejector nozzles 108 with a square cross-section are shown in FIGS. 6 and 7. The square cross-section may potentially provide a more uniform current distribution flow through the print material 104 than the circular cross-section of FIG. 3. Any other desired cross-sectional shapes, such as other polygons, ovals and so forth, may be employed for the passageways 106C.

Figure 8:
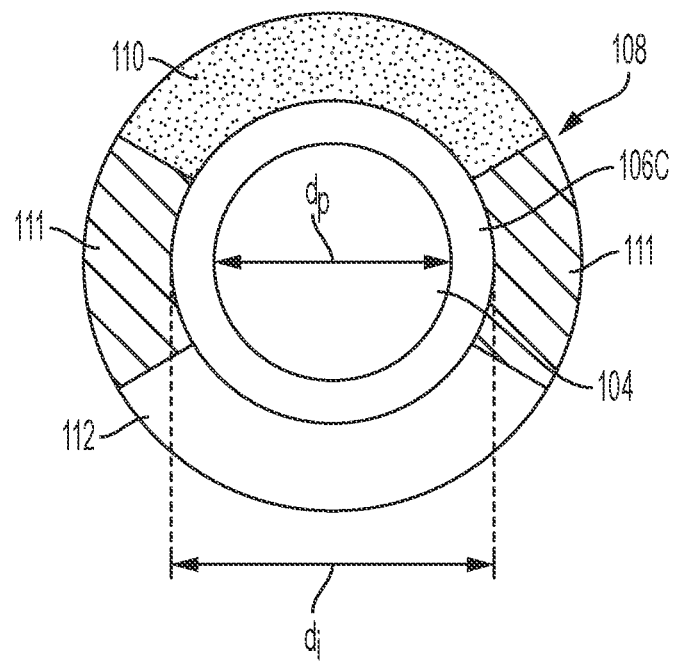
FIG. 8 illustrates a cross-sectional, schematic view of an ejector nozzle having an inner diameter, $d_i$, according to an embodiment of the present disclosure.

Referring to FIG. 8, the ejector nozzle 108 has an inner width, $d_i$, which is the diameter if the cross-section of passageway 106C is circular. If the cross-section of passageway 106C is not circular, $d_i$ is the length of the shortest straight line between opposing insulator portions 111 where the straight line passes through a longitudinal axis, "$\ell$", shown in FIGS. 1, 6 and 7 (where the longitudinal axis is going into the page in FIGS. 6 and 7), of passageway 106C. The cross-section of the ejector nozzle 108 to be used for determining $d_i$ lies in a plane that is perpendicular in all directions to the longitudinal axis, "$\ell$", at the point where the cross-section intersects the passageway 106C. If there is more than one possible value for $d_i$ (e.g., such as if the value for $d_i$ varies along the length of the ejector nozzle 108), then the $d_i$ is the smallest of the possible $d_i$ values for the ejector nozzle 108. Example values for $d_i$ include, for example, from about 10 microns to about 1000 microns, from about 20 microns to about 500 microns, from about 50 microns to about 200 microns, or about 100 microns. In an embodiment, $d_i$ ranges in size from about 10 microns to about 100 microns, about 10 microns to about 50 microns, or about 10 microns to about 25 microns. A length, $L_w$, (FIG. 3) of the first electrode 110 and second electrode 112 (or the combined length of the plurality of electrode pairs if multiple electrode pairs are employed, such as in FIG. 5) can range, for example, from about 1 to about 10 times the inner width, $d_i$ (e.g., diameter). The design and materials of the ejector nozzles 108 can be the same as or different than the remaining portion of the ejector conduits 106. The total length of the ejector conduits 106, including the length of the nozzles, can be any suitable length, such as, for example, a length that is about 2 to about 100 times, or about 4 to 20 times, the length, $L_w$, of the electrodes 110 and 112.

In an embodiment, as illustrated in FIGS. 1 and 2, the passageway 106C of the ejector conduits 106 have a first width at the first end 106A, the first width being wider than the inner width, $d_i$, of the ejector nozzle 108 in order to allow the print material to be easily threaded into the first end 106A, while allowing passageway 106C to closely fit around the print material within the ejector nozzle 108. In an embodiment, the passageway 106C can gradually taper from the first width to the inner width to avoid print material 104 in the form of a solid filament from being caught in and/or undesirably blocking the passageway 106C.

The feeder mechanism 102 can by any suitable mechanical system, pressure driven system or other system capable of feeding print material 104 to the ejector conduits 106. The feeder mechanisms can comprise one or more pumps, actuators or combination thereof that can function as a mover 102a (FIG. 18) for moving the print material 104. Examples of suitable actuators include electric motors, piezo electric motors, inchworm actuators, hydraulic actuators, and pneumatic actuators. The type of feeder mechanism 102 that is used will depend on the type of print material 104 being employed. In an example, print material 104 comprises a plurality of filaments and the feeder mechanism 102 is a mechanism for advancing the plurality of filaments. The term "filament" or "filaments" for purposes of the present disclosure is defined to include both solid wire-like filaments or liquid filaments, such as liquid filled capillaries or other liquid filled conduits. Examples of feeder mechanisms for solid filaments include spool feeders and inch worm actuators, which are well known in the art. Other feeder devices for ratcheting or otherwise advancing solid print material 104 to the ejector conduits 106 in the form of solid filaments, dry powders or other solid forms can also be employed as the feeder mechanism 102, as would be understood by one of ordinary skill in the art.

In embodiments, the feeder mechanism 102 can be any suitable mechanism for supplying a liquid print material, such as a liquid filament, into the ejector conduits 106 and advancing the liquid print material to the ejector nozzles 108. Examples of suitable feeder mechanisms for liquid print materials include mechanisms employing capillary forces and/or overpressures sufficient to advance the liquid from a reservoir or other source of print material (e.g., molten metal) and thereby stably refill the ejector nozzles 108 after ejection occurs (e.g., the feeder mechanism can be designed to automatically refill the ejector nozzles after an ejection occurs). The feeder mechanisms 102 can comprise, for example, a pump, a feeder conduit and/or print material reservoir configuration that can be filled with print material to provide a hydrostatic pressure head (e.g., by maintaining a certain fill level of print material in the reservoir), or any other device for applying overpressure. Such feeder mechanisms are well known in the art. One of ordinary skill in the art would be able to readily determine an appropriate feeder mechanism.

In an embodiment, the feeder mechanism 102 can supply the print material to each ejector conduit 106 at a different feed rate. As an example, a feeder mechanism 102 for advancing the plurality of filaments comprises a separate mechanism for incrementally advancing each of the plurality of filaments at a separately controllable feed rate. Thus, in an embodiment, as the ejection rate at each ejector is increased or decreased as desired for printing, the feed rate is able to satisfy replenishment of print material 104 to the ejector nozzles before the next ejection.

At least a portion of each of the plurality of ejector conduits 106 comprises an electrically insulating material that provide suitable electrical insulation to avoid electrical shorting during operation of electrodes 110,112. The electrically insulating material can be chosen to withstand process temperatures while maintaining desired structural integrity. In an embodiment, the entire ejector conduits 106 except for the electrodes 110 and 112 can be electrically insulating materials, as shown for example, in FIG. 1. In an embodiment, the conduits 106 can comprise an electrically conductive material clad with an insulating material. The electrically insulating material employed for conduits 106 can be, for example, a refractory material, such as a refractory material chosen from metal oxides (e.g., glass, such as doped or undoped silica), ceramics and combinations thereof. For purposes of the present disclosure, the terms "refractory material" and "refractory materials" are broadly defined as any materials that have a melting point 1000° C. or more at 1 atmosphere pressure. For example, the refractory material can have a melting point ranging from 1000° C. to about 4000° C., such as about 1200° C. to about 4000° C., or about 1400° C. to about 3500° C., or about 1700° C. to about 3500° C., or about 2000° C. to about 3500° C. Ejector conduit materials can have melting points outside of these ranges. For example, where the print material 104 is a polymer, ejector conduits can potentially be made of materials with melting points lower than 1000° C., such as 800° C., 700° C., 500° C. or lower.

Figure 9:
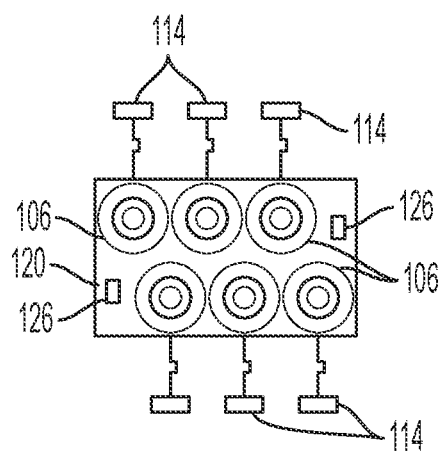
FIG. 9 illustrates a top, schematic view of a printer jetting mechanism comprising columns of ejector conduits that are staggered, according to an embodiment of the present disclosure.
Figure 10:
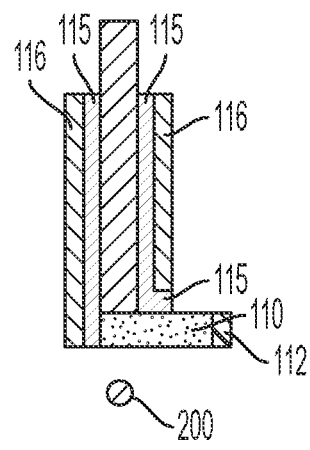
FIG. 10 illustrates a schematic, cross-sectional side view of an ejector conduit, according to an embodiment of the present disclosure.
Figure 11:
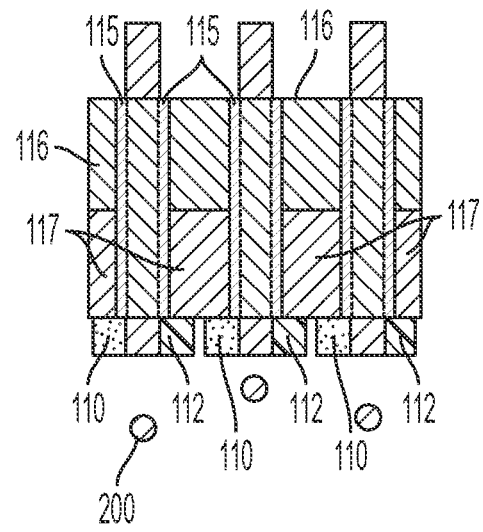
FIG. 11 illustrates a schematic, cross-sectional side view of an array of ejector conduits, according to an embodiment of the present disclosure.

In an embodiment, the ejector conduits 106 comprise a combination of electrically insulating materials and other materials, such as where at least a portion of each of the plurality of ejector conduits 106 comprises a thermally conductive material, such as a metal. The thermally conductive materials can be employed to transfer thermal energy from heater mechanisms 126 (FIGS. 2 and 9) to the print material 104 in order to raise and maintain the temperature of the print material 104, as desired. Heater mechanisms 126 will be described in greater detail below. FIG. 10 illustrates an example of one such embodiment wherein the ejector conduits 106 comprise an inner conduit portion 115 that is electrically insulating and an outer conduit portion 116 that comprises a thermally conducting material that is different than the electrically insulating material of the inner conduit portion. FIG. 11 comprises yet another example configuration in which ejector conduits 106 arranged in an array each comprise an inner conduit portion 115 that is electrically insulating. A first outer conduit portion 116 is positioned to surround an upper region of the inner conduit portions 115. The first outer conduit portion 116 comprises a thermally conductive material. A second outer conduit portion 117 is positioned to surround a lower region of the inner conduit portions 115. The second outer conduit portion 117 comprising a second electrically insulating material, which can be the same as or different than the electrically insulating material of the inner conduit portion 115. While the second outer conduit portion 117 appears about as thick as first outer conduit portion 116 in FIG. 11, the second outer conduit portion 117 can be thinner than first outer conduit portion 116, so long as sufficient electrical insulation is provided between electrodes 110 and 112 and any electrically conductive materials being employed in conduits 106, such as where first outer conduit portions 116 are electrically conductive. In yet another embodiment, inner conduit portion 115 is sufficiently thick to provide electrical insulation for electrodes 110 and 112 (e.g., such as where inner conduit portion 115 is thicker than a width of electrodes 110 and 112), in which case first outer conduit portion 116 can extend the full length of the ejector conduits 106. Various other designs for ejector conduits 106 can be implemented. The electrically insulating materials for inner conduit portion 115 (FIGS. 10 and 11) and second outer conduit portion 117 can include, for example, any of the electrically insulating materials described herein for use as the ejector conduits 106. The outer conduit portion 116 of FIGS. 10 and 11 can comprise any thermally conductive material that provides effective thermal conductivity for transferring heat to the print material 104 and that can withstand process temperatures while maintaining structural integrity. Examples of thermally conductive materials include graphite, refractory metals or other metals with a suitably high thermal conductance and melting point for the printing application, such as copper, copper alloys, platinum and platinum alloys, and combinations thereof. The term "refractory metal" or "refractory metals" as used herein is defined to include the elemental refractory metals and alloys thereof, including, for example, niobium, molybdenum, tantalum, tungsten, rhenium, titanium, vanadium, chromium, zirconium, hafnium, ruthenium, rhodium, osmium, iridium and alloys of any of these metals, such as alloys of two or more of any of the refractory metals listed herein or alloys of one or more of the refractory metals with other metals, such as iron, nickel, copper, silver or others. Suitable refractory metal alloys are known in the art.

Figure 12A:
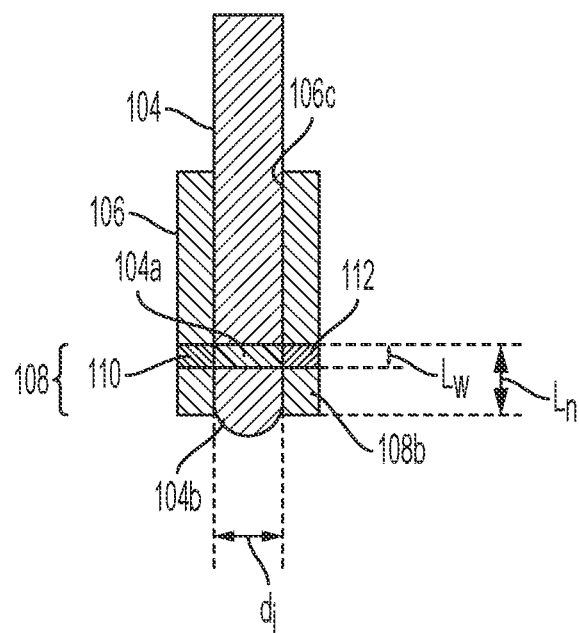
FIG. 12A illustrates a schematic, cross-sectional side view of an ejector conduit with a print material therein that can be employed in the printer jetting mechanisms described herein, according to an embodiment of the present disclosure.
Figure 12B:
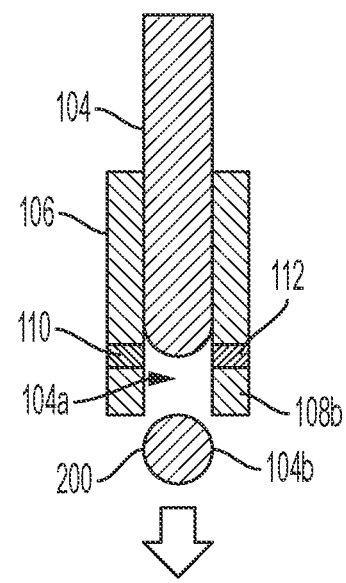
FIG. 12B illustrates a schematic, cross-sectional side view of the ejector conduit of FIG. 12A, after vaporization of a portion of the print material and ejection of another portion of the print material below the vaporized portion, according to an embodiment of the present disclosure.

FIG. 12A illustrates a configuration of an ejector conduit 106 that can be employed in any of the printer jetting mechanisms 100 described herein, according to an embodiment of the present disclosure. The ejector conduit 106 of FIG. 12A comprises a first electrode 110 and a second electrode 112 positioned proximate a top portion of the ejector nozzle 108. The current pulse generating system is capable of causing a pulse of current to flow predominantly between the first electrode 110 and the second electrode 112 when the print material 104 is positioned in the ejector nozzle, thereby ohmically heating and expanding the print material 104a between the first electrode 110 and second electrode 112. This provides the desired expansion and jetting of the print material 104 from the ejector nozzle 108. In an example, the print material 104a between electrodes 110 and 112 is vaporized to provide the desired expansion and thereby drive ejection of the print material 104b that remains in liquid form below the electrodes 110, 112 from the ejector nozzle 108, as illustrated in FIG. 12B. The length, $L_w$, of electrodes 110 and 112 can be any desired length that will allow sufficient ohmic heating or print material 104 for ejection. Examples of suitable values for $L_w$ are about 5 microns to about 1000 microns, such as about 5 microns to about 500 microns, such as about 10 microns to about 100 microns, or about 15 microns to about 50 microns.

In the embodiments described herein, the electrodes 110, 112 can be positioned entirely in the ejector nozzle 108 (e.g., FIG. 12A) and/or can be positioned at the tip (e.g., the end most position) of the ejector nozzle 108 (e.g., FIG. 1). The ejector nozzle 108 is an end most portion of ejector conduits 106 and has a length, $L_n$, (FIG. 12A) ranging, for example, from about 1 to about 10 times the inner width, $d_i$ (e.g., diameter) of the ejector nozzle 108, as described herein. In other examples, the length, $L_n$, of the ejector nozzle 108 ranges, for example, from about 1 to about 5 times $d_i$, about 1 to about 3 times $d_i$, about 1 to about 2 times $d_i$, or is about equal to $d_i$. In an embodiment, the length, $L_w$, of the electrode is equal to the length, $L_n$, of the ejector nozzle.

Referring to FIG. 2, the plurality of ejector conduits 106 are supported within an ejector housing 120. The ejector conduits 106 can be separate structures from the housing material and can be mounted in any suitable fashion to the ejector housing 120. In an alternative embodiment, the plurality of ejector conduits can be integral with the ejector housing 120. For example, the conduits can be formed as capillaries or larger conduits bored or otherwise formed directly in the housing material. The conduits can optionally be coated to provide an inner surface of the ejector conduits 106 comprising a material that is different from, but integral with, the ejector housing 120. Techniques for forming such conduits directly in the housing material, as well as techniques for coating the conduits, are generally well known. In embodiments, the ejector conduits 106 can comprise a different material or the same material as the ejector housing 120.

The ejector housing 120 comprises any suitable materials that can withstand jetting process temperatures and that can provide the desired support for the ejector conduits 106. Examples of suitable housing materials include materials chosen from metals, such as aluminum, copper, brass and steel, refractory metals, ceramics, other refractory materials, polymers that are capable of withstanding process temperatures (e.g., polymers with melting points of 150° C. to 650° C. or higher, such as 200° C. to 300° C.) and combinations thereof, such as metal coated ceramics and ceramic coated metals. An example of a composite housing material is copper clad with a ceramic, such as mullite, where the copper and mullite have similar thermal expansion coefficients. The specific material employed will depend on the print material to be jetted.

In an embodiment, the ejector housing 120 comprises a heater mechanism 126 for heating at least a portion of the ejector housing 120 surrounding the ejector conduits 106 during operation of the three-dimensional printer. The heater mechanism 126 can provide sufficient thermal energy so as to bring the print material 104 to at or just below a desired temperature for print material expansion and ejection. For example, in cases where expansion to provide ejection momentum of the print material does not involve a phase change, then heater mechanism 126 can provide sufficient thermal energy so as to bring the print material 104 to just at or above melting temperature. Alternatively, in the case of a phase change expansion to provide momentum of the print material for ejection, heater mechanism 126 can provide sufficient thermal energy so as to bring the print material 104 to a temperature just below the melting temperature or vaporization temperature of print material 104, as desired. In an embodiment where phase change of the print material occurs, by controlling the print material temperature near the ejection site, heat loss away from the ejector nozzle 108 (e.g., the melt zone or vaporization zone) can be reduced because the phase change is an isothermal process. In embodiments where the print material 104 is a solid prior to phase change, temperatures lower than the melting temperature can be desirable to ensure resolidification of non-ejected material before the next ejection event.

Heater mechanism 126 can comprise, for example, any suitable type of resistive heater, inductive heater, radiant heater or combination of any of these. For instance, heater mechanism 126 comprises heating elements that are embedded in or positioned proximate to the conduits 106 and/or the ejector housing 120, such as illustrated in FIGS. 1 and 9. The heating elements can be in the form of resistive heating coils or induction coils, as examples. As an example, a suitable resistive heater mechanism comprises an ohmic meander trace embedded in the ejector housing 120 or ejector conduits 106 surrounding the passageway 106C. The term "ohmic meander trace," as used herein, refers to a conductive heating element that has a non-linear path along a longitudinal axis (e.g., a wire suitable for resistive heating having a zig-zagging, winding or otherwise curved path). The heater mechanism 126 is separate from the current pulse generating system 114 and/or electrodes 110, 112.

In an embodiment, the array of ejector conduits 106 includes M columns of ejector conduits arranged on an X axis and N rows of ejector conduits arranged on a Y axis, where M is an integer ranging from 2 to 1000 and N is an integer ranging from 1 to 2. For example, M is 3 and N is 1 for the array of FIG. 2, while M is 3 and N is 2 for the array of FIG. 9. In other examples, M is an integer ranging from 5 to about 1000, about 50 to about 1000, about 100 to about 500, or about 500 to about 1000.

In an embodiment, the rows of the ejector conduits 106 are arranged linearly and the ejector conduits 106 in each row are staggered with respect to the ejector conduits of adjacent rows to facilitate closer packing, as shown, for example, in FIG. 9. In an alternative embodiment (not shown), the columns of the ejector conduits 106 are arranged linearly and the ejector conduits 106 in each column are staggered with respect to the ejector conduits of adjacent columns. Multiple arrays can be stacked to extend the number of rows or columns in a system, as desired.

Figure 13:
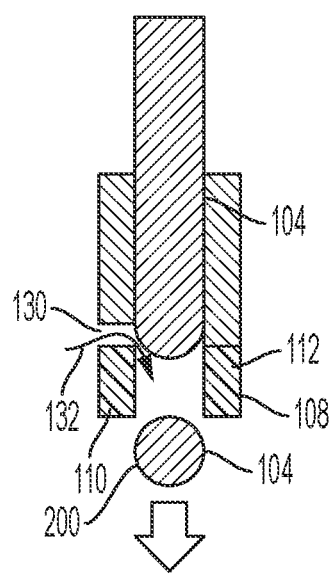
FIG. 13 illustrates a schematic, cross-sectional side view of an ejector conduit comprising a vent, according to an embodiment of the present disclosure.
Figure 14A:
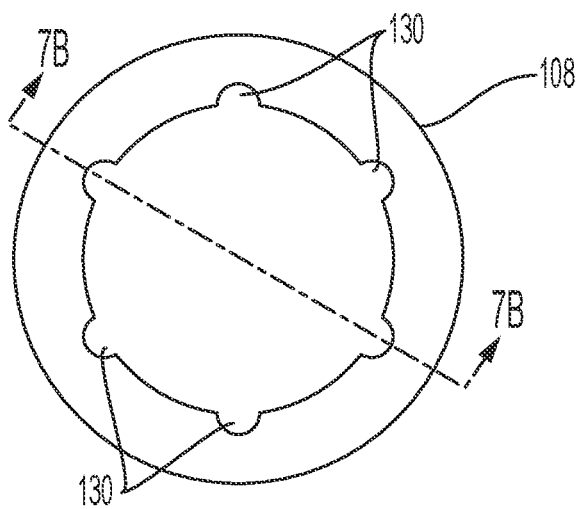
FIG. 14A illustrates a schematic, bottom view of an ejector nozzle comprising a plurality of vents, according to an embodiment of the present disclosure.
Figure 14B:
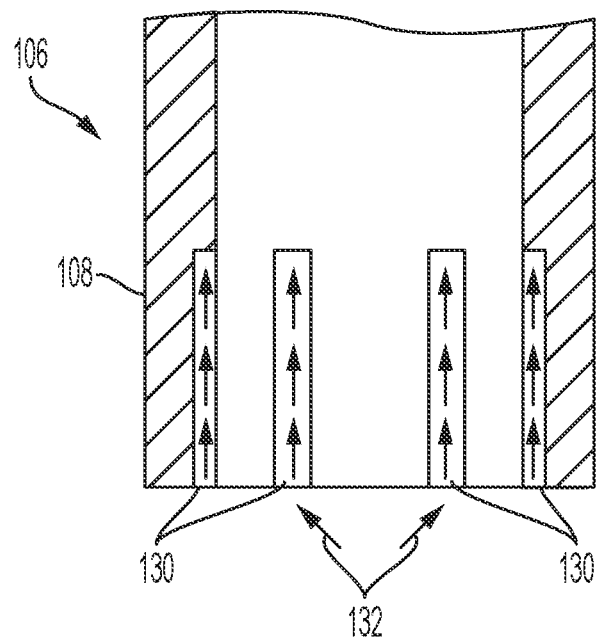
FIG. 14B illustrates a schematic, cross-sectional view along line A-A of a portion of an ejector conduit 106 that includes the ejector nozzle of FIG. 14A, according to an embodiment of the present disclosure.

Droplet formation during ejection of the print material can occur by any suitable mechanism within or outside of the ejector nozzles 108. In an embodiment, detachment of the print material to form droplets can occur by necking off of the print material inside of the ejector conduits 106, such as within nozzles 108. In such embodiments, the ejector conduits 106 can optionally include one or more vents 130, such as illustrated in FIG. 13. Vents 130 can be positioned in or just above ejector nozzles 108, such as at or near the position in the ejector nozzle 108 where necking off of the print material 104 being ejected from the remaining print material 104 in ejector conduit 106 is to occur during droplet formation. The vents 130 allow air or other ambient gas (as illustrated by arrow 132) to flow into the ejector conduits 106 and/or into the ejector nozzles 108 as the print material 104 is ejected therefrom. This can allow the print material 104 being ejected to more easily be separated from the remaining print material 104 in ejector conduit 106 and/or more easily be ejected from the ejector nozzles 108. The one or more vents 130 can be configured in any manner that will allow ambient gas to flow into the ejector nozzle as the print material 104 is ejected. FIGS. 14A and 14B illustrate another example in which the vents 130 take the form of grooves on the inner surface of the ejector nozzles 108. Any other suitable vent configurations could be employed. In an embodiment, the vents 130, such as in FIGS. 13, 14A and 14B have dimensions that are sufficiently small so that the surface tension of liquid print material 104 would not allow substantial amounts of the print material to flow out of the ejector conduits into the vents 130, while being sufficiently large to allow ambient gas to flow through the grooves and into the ejector nozzle 108. For example, the width and/or length of the vent 130 of FIG. 13 or diameters, in the case of circular shaped vents (not shown), or groove widths of FIG. 14 can be ten or more times smaller than the inner diameter of the ejector nozzle so that penetration of the liquid print material is reduced or eliminated. The vents can be formed by any suitable means, such as by etching techniques or laser ablation that are well known in the art.

The present disclosure is not intended to be limited to any specific droplet formation and/or detaching modes. For example, while the droplets can neck off and detach at a detachment zone inside the ejector conduits 106, it is also possible that the droplets can neck off and detach outside the ejector conduits 106, followed by retraction of undetached print material 104 back into the ejector conduit 106. Thus, a mode of jetting of droplets can include expansion "extrusion" of the molten print material 104 out from the ejector nozzle 108 into free space followed by a deacceleration/retraction of the extruded print material 104 as the heating pulse is terminated and the print material 104 cools/contracts. Other modes of jetting and/or detaching droplets can also be realized.

In an embodiment, ejecting of the print material comprises flowing a sheath gas proximate the ejector nozzle, the sheath gas comprising one or both of an inert gas and a reducing gas. An example of employing a sheath gas is illustrated by the arrows 210 in FIG. 16. The sheath gas flow can be accomplished in any suitable manner, such as, for example, by flowing the sheath gas through sheath gas vents 212 positioned within or proximate to the printer jetting mechanism 100, such as in the array 107 and/or the ejector housing 120 of any of the printer jetting mechanisms described herein. In an embodiment, the sheath gas is maintained at a desired temperature so as to avoid cooling the print material prior to deposition. For example, the sheath gas temperature can be at or above the melting point of the print material. In this manner, the print material can be maintained in a molten state until deposition on the substrate occurs, if desired. In an embodiment, the sheath gas can be moving at approximately the same velocity, and in approximately the same direction, as the droplets when they are ejected.

Figure 15:
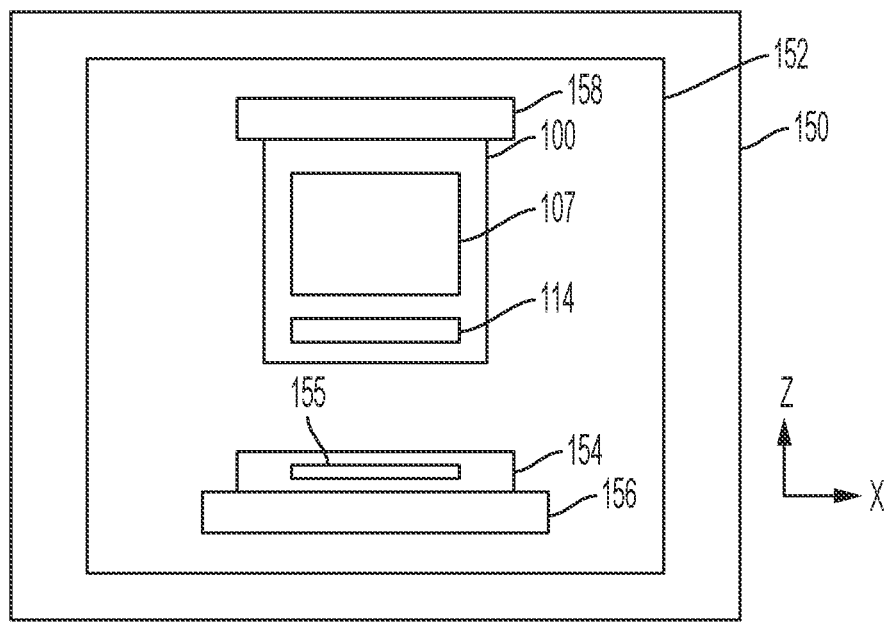
FIG. 15 is a block diagram of a 3D printer, according to an embodiment of the present disclosure.

The printer jetting mechanisms 100 described herein can be employed in any type of printer that is suitable for jetting of a print material. In an embodiment, the printer is a three-dimensional ("3D") printer usable for printing 3D objects. A block diagram of an example 3D printer 150 is shown in FIG. 15. The 3D printer 150 can comprises any of the printer jetting mechanisms 100 comprising an array 107 of ejector conduits 106, as described herein. Additionally, the 3D printer can comprise a positioning system 152 for controlling the relative position of the array 107 with respect to a print substrate 154. The phrase "controlling the relative position of the array 107 with respect to the print substrate 154" means that either one or both of the array 107 and the print substrate 154 can be moved in order to alter the relative position of the array with the print substrate. The relative position of the array 107 with the print substrate 154 is modified during printing so that the print substrate 154 is positioned to receive print material 104 jettable from the plurality of ejector conduits and thereby form a 3D object. The positioning system 152 can comprise one or both of a print substrate handling mechanism 156 for positioning the print substrate 154 and an array positioning mechanism 158 for positioning the array 107 and optionally other parts of the printer jetting mechanism 100, such as portions of, or electrical connections to, the current pulse generating system 114. The print substrate 154 can comprise any substrate on which it is desirable to print a three-dimensional object. An example of a print substrate 154 is a build plate that is part of the 3D printer 150, or other temporary substrate from which the 3D object may be removed after printing. In another example, the print substrate 154 may be intended to be permanently attached to the three-dimensional object after printing, such as, for example, if the print substrate 154 is a printed circuit board on which a portion of a circuit is being printed.

Figure 18:
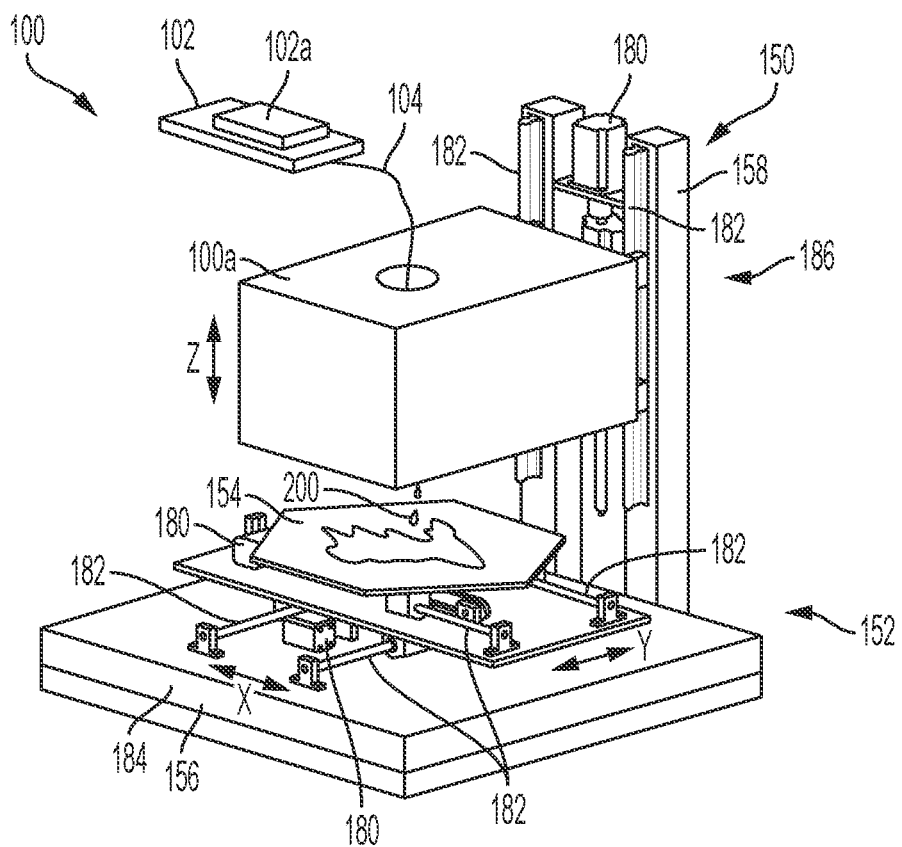
FIG. 18 is a schematic view of a 3D printer, according to an embodiment of the present disclosure.

The print substrate handling mechanism 156 can be any mechanism suitable for positioning the print substrate 154 to receive print material jettable from the plurality of ejector conduits arranged in array 107 during operation of the 3D printer 150. In an embodiment, the print substrate handling mechanism 156 has the ability to position the print substrate 154, such as a build plate or other substrate, by moving the print substrate 154 in a direction along an x-axis, a y-axis and/or a z-axis to a desired position to which the jetted print material is targeted. The array positioning mechanism 158 can be any mechanism suitable for moving the array 107 in a direction along one or more of an x-axis, a y axis and/or a z-axis to a desired position to which the jetted print material 104 is targeted. The positioning system 152, including either or both of the print substrate handling mechanism 156 and the array positioning mechanism 158, can comprise one or more actuators 180 (FIG. 18) that can function as a mover for positioning the print substrate 154 and array 107 relative to each other using, for example, a system comprising tracks 182. Examples of suitable actuators include electric motors, piezo electric motors, hydraulic actuators, and pneumatic actuators. FIG. 18 illustrates an example of such a positioning system 152, which comprises an actuated (e.g., motorized) X-Y stage 184 for supporting the print substrate 154 and a vertical track system 186 on which all or a portion 100a of printer jetting mechanism 100 can be moved using one or more actuators 180 to allow for vertical positioning. Portion 100a of printer jetting mechanism 100 can comprise any of the components of printer jetting mechanism 100 described herein that are attached to the vertical track system 186 for vertical positioning, including the plurality of ejector conduits arranged in an array and all or part of the current pulse generating system. The feeder mechanism 102 can be positioned so as not to be directly attached to the vertical track system 186 (as illustrated in FIG. 18), or in other embodiments, can be directly attached to the vertical track system 186.

As mentioned, the positioning system 152 can comprise one or both of the print substrate handling mechanism 156 and the array positioning mechanism 158. As an example, the print substrate handling mechanism 156 can be used to move the print substrate 154 along both the x-axis and y axis, and the array positioning mechanism 158 can be used to move the array 107 and optionally the entire printer jetting mechanism 100 or any portion thereof along the z-axis, thereby allowing the print substrate 154 and array 107 to be positioned relative to each other in three-dimensions during operation of the 3D printer. As an example, for purposes of this discussion, the x-axis and z-axis are as illustrated relative to a printing operation in FIG. 16, with the y-axis (not shown) being in the direction into the paper; the x-axis and y-axis being parallel to the upper surface of the print substrate 154 and the z-axis being perpendicular to the upper surface of the print substrate 154. In an embodiment, the print substrate 154 is a build plate and optionally employs a heating mechanism 155 that is capable of heating the build plate to desired deposition temperatures. Suitable build plates, including build plates with heating mechanisms, are well known in the art.

Methods of Jetting Print Material

An embodiment of the present disclosure is directed to a method for jetting print material from a printer jetting mechanism. As described at 200 of FIG. 17, the method comprises supplying a print material 104 that is electrically conductive to a plurality of ejector conduits 106 (FIGS. 1 and 2) arranged in an array. The ejector conduits 106 comprise first ends 106A configured to accept the print material and second ends 106B comprising ejector nozzles 108. The ejector nozzles 108 can have an inner width (e.g., diameter) ranging, for example, from about 10 microns to about 1000 microns, or any of the other ejector nozzle widths disclosed herein. In the methods described herein, ejector nozzles 108 comprise electrodes 110, 112 for supplying electrical current to induce thermal expansion and ejection of the print material as will be discussed in greater detail below.

Figure 17:
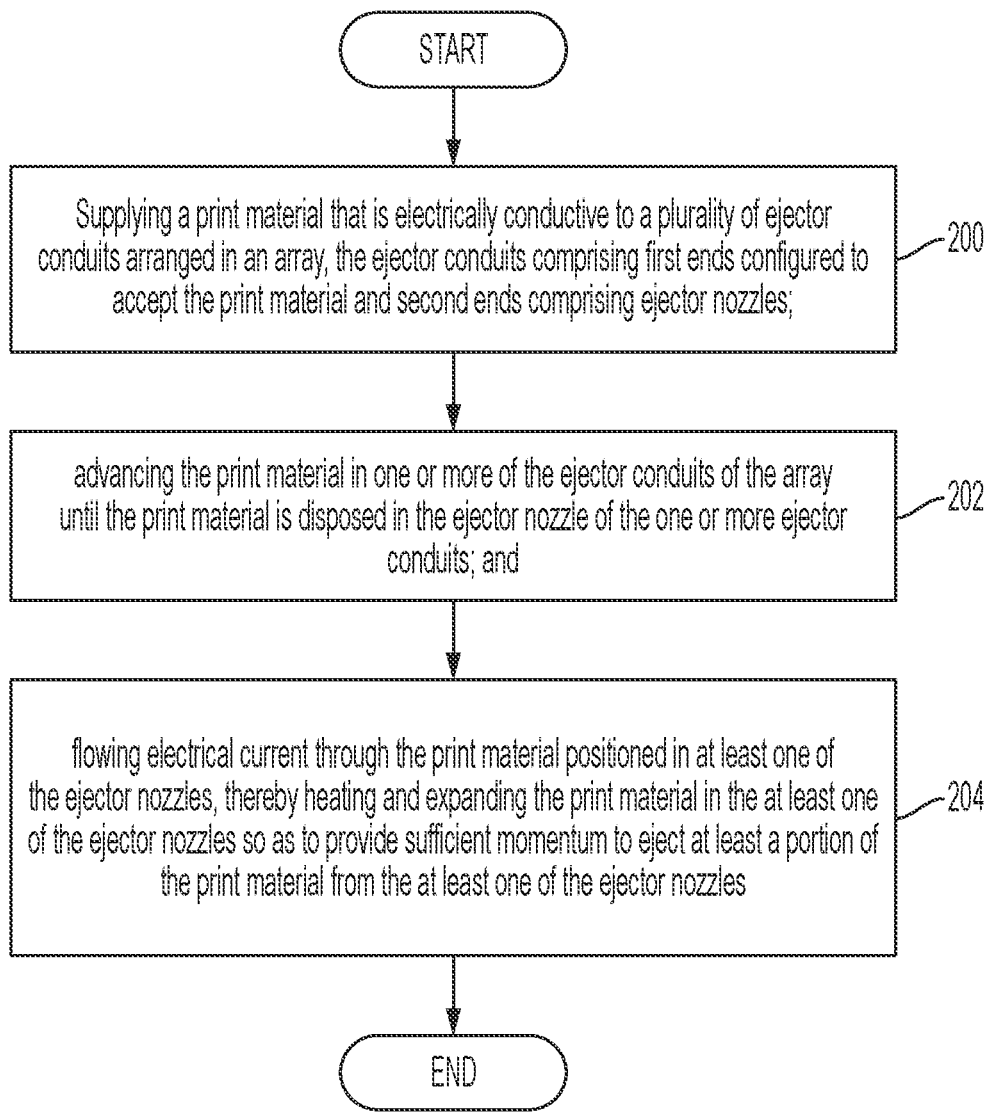
FIG. 17 is a flow diagram of a method for jetting print material from a printer jetting mechanism, according to an embodiment of the present disclosure.

As shown at 202 of FIG. 17, the print material 104 is advanced in one or more of the ejector conduits 106 of the array until the print material 104 is disposed in the ejector nozzles 108 of the one or more ejector conduits 106. As an example, print material 104 can be advanced to substantially or completely fill the ejector nozzle 108. In an embodiment, the print material 104 comprises a plurality of filaments. An individual filament of the plurality of filaments can be advanced to each of the one or more ejector conduits 106 to supply print material at a desired feed rate. The desired feed rate can be different for each filament depending on the rate at which the print material is being ejected from the associated ejector nozzles 108, which in turn will depend on the number of ejections per unit time from each nozzle and the droplet size per ejection.

As shown at 204 of FIG. 17, the print material 104 positioned in at least one of the ejector nozzles 108 is heated by flowing electrical current through the electrically conductive print material 104 positioned in at least one of the ejector nozzles 108, thereby heating and expanding the print material in a chosen time so as to provide sufficient momentum to eject at least a portion of the print material from the at least one of the ejector nozzles 108 onto, for example, a print substrate. The flowing of the electrical current can comprise, for example, employing a current pulse generating system 114, such as any of the current pulse generating systems herein, to send a current pulse between the first electrode 110 and the second electrode 112.

In an embodiment, the current pulse causes the print material 104 to undergo a phase transition from a first phase to a second phase to achieve the desired expansion. In one example of a phase change expansion, filaments in solid phase are supplied as print material 104 to the ejector nozzles 108. The heating of the print material 104 positioned in the ejector nozzles 108 melts the individual filaments using a single current pulse to provide the desired momentum of the print material for ejection. In embodiments where the print material 104 is a solid and then is phase changed to a liquid, controlling the temperature of the print material remaining in the ejector conduit 106 so as to be lower than the melting temperature directly after each ejection can be desirable to ensure resolidification of any non-ejected liquid material before the next ejection event.

In another example of a phase change expansion, print material 104 is supplied as a liquid phase to the ejector nozzles 108. The heating of the print material 104 positioned in the ejector nozzles 108 vaporizes at least a portion of the liquid print material 104 using a single current pulse to provide the desired momentum of the print material for ejection.

Even without undergoing a phase change, some print materials can expand sufficiently in the liquid phase as their temperature increases to drive ejection. In an embodiment, the print material 104 is supplied to the ejector nozzle as a liquid and thermally expanded while being maintained in liquid form during the entire duration of heating so as to eject the liquid from the ejector nozzle 108. In an embodiment, the liquid print material 104 is expanded sufficiently rapidly using a single current pulse to provide the desired momentum of the print material for ejection without undergoing a phase change.

The ejection force, or momentum, of the print material being ejected from the ejector nozzles 108 is dependent on both the amount of thermal expansion and the rate of expansion of the print material, which in turn are dependent on both the amount of thermal energy added to the print material and the amount of time it takes to add the thermal energy to the print material. Thus, to impart the desired momentum to the print material so that a drop of print material can be ejected from the ejector conduit 106 and deposited onto a substrate, a relatively short pulse of sufficiently high current can be employed to achieve the desired amount of expansion. The pulse length of the current can be any duration that will provide the desired rate of expansion and cause print material 104 to be ejected. Examples of suitable pulse lengths range from about 0.1 microsecond to about 100 milliseconds, about 1 microsecond to about 1000 microseconds, or about 2 microseconds to about 100 microseconds. The rapid heating causes the print material to expand axially inside the ejector nozzle 108 so as to provide sufficient momentum to the print material 104 to eject at least a portion of the print material from the ejector nozzle 108. The amount of current and the length of the current pulse to achieve the desired momentum of the ejected print material will depend on such things as the type of print material and amount of print material being ejected and can readily be determined by one of ordinary skill in the art. In addition to providing the momentum for ejection, shorter current pulse lengths can also potentially allow for a faster ejection rate (e.g., increased number of ejections of print material per second from the same ejector nozzle).

While achieving the expansion of print material 104 using a single pulse of current is taught above, it may also be useful to use more than one pulse of current to achieve expansion, either from the same or multiple pairs of electrodes. For example, 2, 3 or more rapid pulses can be employed to achieve the desired expansion of the print material as opposed to a single longer pulse. In general, any desired pulse waveform can optionally be chosen that can provide the desired ejection of print material.

Drop sizes can be individually selected on-demand. In an embodiment, drop sizes can be varied by varying the current pulse energy for each pulse (e.g., varying pulse length and/or amplitude of the current pulse). In another emobodiment, multiple addressable electrodes (similar to that shown in FIG. 5 but with each electrode driven independently) can be employed to vary the drop volume. Thus, during operation, the current generating system can be used to send an electrical pulse between a first number of electrode pairs (e.g., one or more of electrode pairs 110a, 112a; 110b, 112b and 110c, 112c of FIG. 5) to realize a first ejection, and subsequently send an electrical pulse between a second number of the electrode pairs to realize a second ejection, the first number of electrode pairs being different than the second number of electrode pairs. In this process, the drop size of the print material ejected in the first ejection would be different than the drop size of the print material ejected in the second ejection.

The droplet size per ejection can be selected based on various factors, including the desired size of details in the object to be printed, the particular properties of the print material (e.g., thermal transfer and expansion properties), properties of the current pulse provided to the print material, nozzle size and so forth. Droplets may generally have a diameter size that is as small as the inner diameter of the ejection nozzle 108 but could potentially have significantly larger diameters if longer lengths of filament are heated during a single ejection. When determining the amount of print material to be heated for each ejection, the trade-offs between power and droplet size can be considered. In particular, a longer length of filament can be heated with proportionally higher power, enabling a larger length of print material to be ejected. In an embodiment, the length of print material heated per pulse is about 1 time to about 10 times the inner width (e.g., diameter) of the print nozzle 108 (which inner width may be about the same as the filament width, dp, in the case where solid filaments are being fed directly into the print nozzle) each time the print material is jetted. Thus, as an example, the filament can be stepped forward from about one diameter length of the print nozzle per pulse of current to about 10 diameter lengths per pulse, the pulse of current ohmically heating and expanding each length of the filament as it is stepped forward.

After ejection of the print material 104, additional print material 104 can be advanced into the ejector nozzle or nozzles 108 and then the heating and associated expanding of the print material is repeated to eject additional print material. This process of advancing the print material and heating the print material can be repeated any number of times as desired for each of the ejector nozzles 108 in the array until the printing is complete, thereby forming a 3D object. During the printing, the heating and ejection of print material 104 can occur from a single ejector nozzle 108 in the array at a time, simultaneously from two or more ejector nozzles 108, and/or simultaneously from all of the ejector nozzles 108 in the array, as desired to accomplish the particular printing process being carried out.

Any electrically conductive print material that expands sufficiently during phase change and/or during heating in a single phase (e.g., without phase change) to cause sufficient momentum for ejection can be employed. In an example, the print material comprises at least one metal. The at least one metal can be chosen from, for example, tin, tin alloys, lead, lead alloys (e.g., solder comprising one or both of tin and lead), aluminum, aluminum alloys (e.g., 1000 series, 2000 series, 3000 series, 4000 series, 5000 series, 6000 series, such as 6061 and 6063, and 7000 series aluminum alloys), magnesium, magnesium alloys, iron, iron alloys (e.g., steel), copper, copper alloys (e.g., zinc), nickel, nickel alloys, titanium, titanium alloys, tungsten, tungsten alloys, silver and silver alloys. Suitable alloys of the above named metals can comprise mixtures of any desired metals, such as mixtures of two or more of any of the above named elemental metal print materials (e.g., mixtures of two or more of aluminum, magnesium, iron, copper, nickel, titanium, tungsten, silver and so forth). In an embodiment, the print material 104 has a metal content of greater than 90% by weight, such as about 95% to 100%, or 98% to 100%, or 99% to 100%, or 99.5% to 100%, or 99.8% to 100% by weight, or 99.9% to 100% by weight.

In an embodiment, the print material 104 has a resistivity of less than $1\times10^{-5}$ ohm*m at 20° C., such as about $1\times10^{-6}$ ohm*m or about $1\times10^{-7}$ ohm*m to about x $1\times10^{-8}$ ohm*m at 20° C. (e.g., is electrically conductive at room temperature (20° C.)). In an embodiment, the print material 104 has a resistivity of less than $1\times10^{-5}$ ohm*m, such as about $1\times10^{-6}$ ohm*m to about x $1\times10^{-8}$ ohm*m, while in a solid form, a liquid form, or while in both solid and liquid forms, and while at a temperature of within 300° C. of the melting temperature.

Any of the print materials described herein can be in the form of a plurality of solid or liquid filaments. The solid filaments can have any desired cross-sectional shapes, such as a circle, oval, rectangle or other polygons. The cross-sectional shape of the solid filaments can be the same as that of the cross-sectional shapes of the ejector nozzles 108 (e.g., with smaller dimensions to allow feeding of filaments through the nozzle). For solid filaments that have a circular cross-section, such as shown for print material 104 in FIG. 8, the filament has a width, $d_p$, which is the diameter of the circular cross-section. For solid filaments that do not have a circular cross section, the width, $d_p$, is the dimension that corresponds with (e.g., is collinear with) the inner width, di, of the ejector nozzle 108 if the solid filament were to be fed into the ejector nozzle 108. If there is more than one possible value for $d_p$, then the $d_p$ for the filament is the largest of the possible $d_p$ values.

In the case of solid filaments, the width, $d_p$, of the individual filaments can optionally be chosen to be slightly smaller, or substantially the same as, the inner width, $d_i$, of the ejector nozzle 108, in which the filament is positioned so as to provide a close fit around the solid filament while still allowing the filament to be positioned within the ejector nozzle 108. The fit is sufficiently close so that when the portion of the filament inside the ejector nozzle undergoes expansion, the print material expands in an axial direction at a rate that is sufficient to eject at least a portion of the filament material out of the ejector nozzle 108. As an example, the solid filament width, $d_p$, is 0 to about 2% smaller than the ejector nozzle inner width, $d_i$, such as about 0.1% to about 1% smaller, or about 0.5% smaller. The relative sizing of $d_p$ and $d_i$ may depend on various factors, such as the expansion properties of the print material during phase change, the desired momentum of the print material upon ejection, the rate of heating of the print material in the ejector nozzle and other things. As additional examples, the filament width (e.g., diameter) is about 0.01 micron to 20 microns smaller than the nozzle inner diameter, such as about 0.1 micron to about 10 microns, or about 1 micron to about 5 microns, or about 0.1 micron to about 2 microns, or about 0.1 micron to about 1 micron smaller than the nozzle inner width (e.g., diameter).

Print material can have any suitable widths, such as widths (e.g., diameters) ranging from about 1 micron to about 1000 microns, from about 10 microns to about 500 microns, from about 50 microns to about 200 microns, or about 100 microns. An advantage of ohmic heating is that heat is generated throughout the portion of the filament through which current flows and thus propagation time of thermal energy from the periphery of the filament to the center is not a factor. The ability to heat and expand the entire thickness of a filament in short bursts regardless of filament thickness can allow for increased control of ejection momentum and/or ejection amounts (e.g., droplet sizes), among other things. That said, filaments having relatively small widths (e.g., diameters) may allow for smaller discrete jettable amounts of print material (e.g., smaller droplet sizes ejected from ejection nozzles 108) compared to filaments with larger widths. Therefore filaments with relatively small widths may be preferable for these reasons. Desired small filament width sizes will depend on the thermal diffusivity properties of the print material as well as other factors. As examples, the print material width (e.g., diameter) for a solid or liquid filament ranges from about 1 microns to about 100 microns, such as about 10 microns to about 50 microns, or about 10 microns to about 25 microns. The inner widths of the ejector nozzles can be sized as described above so as to provide a close fit around the individual filaments while still allowing the filaments to be positioned within the ejector nozzles.

In embodiments, the print material 104 is supplied to the ejector conduits as either a liquid or a solid and is ejected from the ejector nozzles 108 as a liquid in the form of droplets. The droplets can optionally have a relatively small droplet size, which can allow for printing of fine details. As examples, droplet diameters can range from about 0.001 mm to about 0.2 mm, about 0.005 mm to about 0.1 mm, about 0.01 mm to about 0.05 mm. Droplets with larger diameters can also potentially be formed if desired.

In an embodiment, the print material 104 is supplied to the ejector nozzles 108 as a first phase that is a liquid and then a portion of the print material is heated to a second phase that is a vapor. Referring to FIGS. 12A and 12B, in such a process, at least a portion of the passageways 106C prior to the ejector nozzles 108 are filled with molten print material (e.g., any of the print materials described herein). All or a portion of passageways 106C can optionally be tapered, as described herein. Using a current pulse transmitted between electrodes 110, 112, a first portion 104a of the molten print material 104 between electrodes 110, 112 is vaporized by rapid heating in the ejector nozzles 108 while a second portion 104b that is between the first portion 104a and a tip of the ejector nozzle 108 remains a liquid. The vaporized portion 104a of print material 104 expands axially to provide motive force that is sufficient to eject the liquid second portion 104b of the print material from the ejector nozzles 108. In an embodiment, the print material 104 can initially be supplied as a solid to the first ends 106A of ejector conduits 106 using the feeder mechanism 102, melted prior to introduction into the ejector nozzles 108, such as by using heat from a heater mechanism 126, then vaporized by rapid heating in the ejector nozzles 108 to provide the desired motive force for jetting. Alternatively, the print material 104 can be supplied as a liquid to the first ends 106A of ejector conduits 106 using the feeder mechanism 102, maintained as a liquid using heat from heater mechanism 126, then vaporized by rapid heating caused by the current pulse between electrodes 110, 112 to provide the desired motive force for jetting.

The method of the present disclosure can be employed to deposit print material 104 from any number of ejector conduits 106 simultaneously or separately as desired. It can also allow for the deposition of small amounts of material from any one ejector nozzle 108 while still providing for a relatively high overall deposition rate due to the potentially large number of ejector conduits 106 in the array and the potentially high rate of ejection from each ejector conduit 106.

Figure 16:
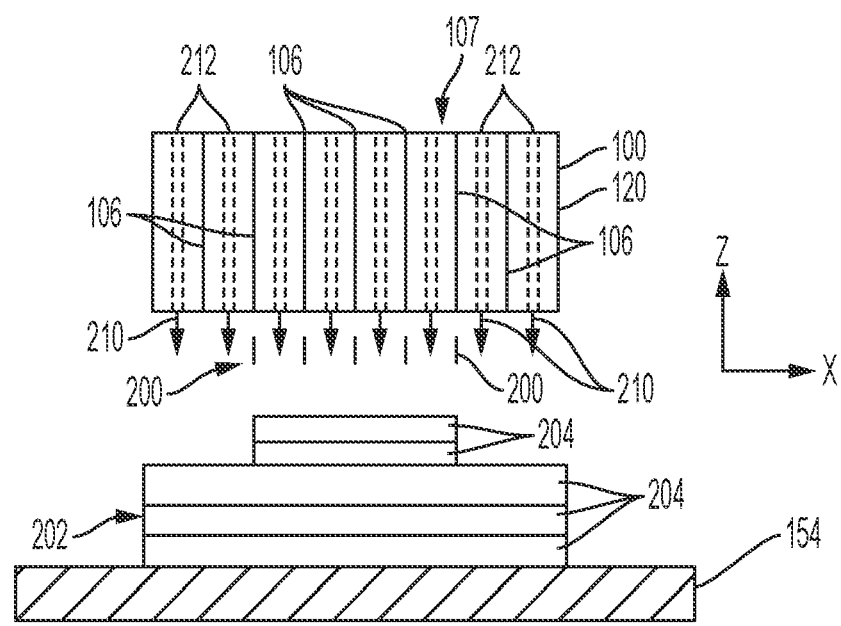
FIG. 16 illustrates a schematic side view of a printer jetting mechanism comprising a plurality of ejector conduits simultaneously ejecting droplets to print a 3D object on a print substrate, according to an embodiment of the present disclosure.

The printer jetting mechanisms for jetting print material described herein can be employed in various printing methods. For example, any of the printer jetting mechanisms described herein can be employed in a method of three-dimensional printing in which print material 104 (FIG. 1) is ejected from the ejector nozzles 108 and deposited onto a print substrate 154 (FIGS. 15 and 16), such as a build plate. One or both of the print substrate 154 and the array 107 of ejector nozzles 108 can move relative to each other in three dimensions during printing (e.g., in directions along an x-axis, y-axis and z-axis), in any manner as described herein, thereby forming a 3D object. As is well known in the art, 3D printing comprises printing multiple droplets or layers of material, where each droplet or layer can be stacked one on the other, until a desired thickness of the 3D object is realized. FIG. 16 illustrates an example of a printer jetting mechanism 100 comprising a plurality of ejector conduits 106 simultaneously ejecting droplets 200 to print a 3D object 202 on a print substrate 154. Many layers 204 of droplets 200 may be deposited, one layer or droplet on the next, until the 3D object 202 is completed. As would be readily understood by one of ordinary skill in the art, the droplets and/or layers can be stacked in any desired order, so that, for example, a first underlying layer 204 may or may not be completed before beginning subsequent layers and there may or may not be a recognizable layering pattern to the order of material deposition. Rather, the droplets, layers and/or portions of layers can be stacked in any desired order to complete the 3D object.

The following examples are illustrative only and are not meant to, nor do they, limit the scope of the invention as set forth in the claims.

PROPHETIC EXAMPLES

Example 1: Solid to Liquid Phase Change Expansion: One each of aluminum, copper and iron wires having diameters of 0.0001 meters are held just below the melting temperature and each fed into a separate refractory tube (e.g. fused silica tube) with an inner diameter just larger than the outer diameter of the wires. A current pulse is flowed through a 0.0001 meter end portion of each wire and melts the wire portion in microseconds. During melting, the expansion of the molten wire material occurs primarily along the direction of the silica tubes longitudinal axis. The free meniscus of the molten material accelerates axially in the tube and the molten region accelerates at approximately half the rate of the meniscus. The acceleration of the molten material in the tube, as shown in Table 1 below, corresponds to an energy well above the energy it takes to detach a droplet of the molten material from the wire and eject it from the tube, thus resulting in a droplet of molten material being jetted from the tube. The energy employed to melt a sufficient portion of the wire for jetting is supplied by a current pulse generating system that is capable of pulsing at the desired pulse power, such as any of the current pulse generating systems described herein.

The calculations in Table 1 below assume no volume between the wire and the tube. The calculated motive force=Average Acceleration of the melt times the mass of the melt. The "pulse energy" in the table refers to the energy to melt the wire length and could potentially be supplied by a single current pulse.

TABLE 1

| Wire Properties | Units | Al wire | Cu wire | Fe wire | |
|---|---|---|---|---|---|
| $T_{melt}$ | C. | 660 | 1084 | 1150 | |
| Density | kg/m$^3$ | 2700 | 8960 | 7870 | $\rho_m$ |
| Latent heat | kJ/kg | 396 | 206 | 247 | $\Lambda$ |
| Specific latent heat | kJ/m$^3$ | 1.07E+06 | 1.85E+06 | 1.94E+06 | $\lambda$ |
| Thermal expansion on melt | | 6.50E−02 | 5.30E−02 | 3.50E−02 | $\varepsilon$ |
| Mass | kg | 2.12E−09 | 7.04E−09 | 6.18E−09 | $m = \rho\pi d^2 l/4$ |
| Diameter | m | 0.0001 | | | d |
| Length | m | 0.0001 | | | l |
| Melting of wire in Silica Tube | | | | | |
| Elongation of wire material in silica tube due to melt | m | 6.50E−06 | 5.30E−06 | 3.50E−06 | $\Delta l = \varepsilon l$ |
| Pulse length of laser | s | 5.00E−06 | | | $t_p$ |
| Meniscus velocity of melt in Tube | m/s | 1.30 | 1.06 | 0.70 | |

TABLE 1-continued

| Wire Properties | Units | Al wire | Cu wire | Fe wire | |
|---|---|---|---|---|---|
| Meniscus Acceleration in Tube | m/s² | 2.60E+05 | 2.12E+05 | 1.40E+05 | $a = \Delta l/t_p^2$ |
| Average acceleration in Tube | m/s² | 1.30E+05 | 1.06E+05 | 7.00E+04 | $a_m = 0.5a$ |
| Motive force | N | 8.78E−05 | 2.37E−04 | 1.38E−04 | $F = ma_m$ |
| Pulse energy for melt | J | 8.40E−04 | 1.45E−03 | 1.53E−03 | $E = m\Lambda$ |
| Pulse power | W | 1.68E+02 | 2.90E+02 | 3.05E+02 | $P = E/t_p$ |

Example 2: Liquid to Liquid Expansion: One each of aluminum, copper, iron and indium wires having diameters of 0.0001 meters are fed into a separate refractory tube (e.g. fused silica) with an inner diameter just larger than the outer diameter of the wires. The refractory tube includes two electrodes positioned at the end thereof. The electrodes are connected to a current pulse generating system and positioned in the tube so flow current through the wire material proximate the end of the tube. Liquid metals such as molten aluminum, mercury (Hg), gallium-indium or gallium-indium-tin eutectic mixtures are fed into a similar silica tube comprising electrodes. For the wires materials, at least a portion of each wire is melted and maintained as a liquid proximate the end of the silica tube, so that the meniscus of the liquid is positioned at the end of the graphite tube. Using the current pulse generating system, a single current pulse is flowed through a 0.0001 meter end portion of each silica tube to heat the liquid material therein so as to increase the temperature by about 300 Kelvin in about 5 microseconds. During heating, the expansion of the liquid materials occurs primarily along the direction of the silica tubes longitudinal axis. The free meniscus of the molten material accelerates axially in the tube and the molten region accelerates at approximately half the rate of the meniscus. The acceleration of the molten material in the tube, as shown in Table 2 below, corresponds to an energy above the energy it takes to detach a droplet of the molten material from the liquid and eject it from the tube, thus resulting in a droplet of molten material being jetted from the tube.

For the calculations in Table 2 below, motive force=Average Acceleration of the liquid times the mass of the liquid. The "pulse energy" in Table 2 refers to the energy to raise the temperature of the liquid by 300 Kelvin and could potentially be supplied by a single current pulse.

TABLE 2

| Wire/Material Properties | Units | | Al Wire | Cu Wire | Fe Wire | Hg | In | |
|---|---|---|---|---|---|---|---|---|
| $T_{melt}$ | C. | | 660 | 1084 | 1150 | | 157 | |
| Density | kg/m3 | | 2700 | 8960 | 7870 | 13600 | 7100 | ρμ |
| Specific heat of melt | kJ/kg-K | | 1.18 | 0.49 | 0.82 | 140 | 230 | c. |
| | J/kg-K | | 1180 | 490 | 820 | | | |
| Thermal expansivity of melt | 1/K | | 1.34E−04 | 1.12E−04 | 9.20E−05 | 1.80E−04 | 1.00E−04 | β |
| Diameter | m | 0.0001 | | | | | | d |
| Length | m | 0.0001 | | | | | | l |
| Mass | kg | | 2.12E−09 | 7.04E−09 | 6.18E−09 | 1.07E−08 | 5.58E−09 | m = rpd2l/4 |
| Molten material heating and expansion in silica tube | | | | | | | | |
| Temperature rise | K | 300 | | | | | | ΔT |
| Elongation | | | 4.02E−02 | 3.36E−02 | 2.76E−02 | 5.40E−02 | 3.00E−02 | ε = βΔT |
| Elongation | m | | 4.02E−06 | 3.36E−06 | 2.76E−06 | 5.40E−06 | 3.00E−06 | Dl = el |
| Pulse length | s | 5.00E−06 | | | | | | tp |
| Velocity meniscus | m/s | | 0.80 | 0.67 | 0.55 | 1.08 | 0.60 | v = Dl/tp |
| Acceleration meniscus | m/s2 | | 1.61E+05 | 1.34E+05 | 1.10E+05 | 2.16E+05 | 1.20E+05 | a = Dl/tp2 |
| Average acceleration | m/s2 | | 8.04E+04 | 6.72E+04 | 5.52E+04 | 1.08E+05 | 6.00E+04 | am = 0.5a |
| Motive force | N | | 1.70E−04 | 4.73E−04 | 3.41E−04 | 1.15E−03 | 3.35E−04 | F = mam |
| Pulse energy | J | | 7.51E−04 | 1.03E−03 | 1.52E−03 | 4.49E−04 | 3.85E−04 | E = mcDT |
| Pulse power | W | | 1.50E+02 | 2.07E+02 | 3.04E+02 | 8.97E+01 | 7.70E+01 | P = E/tp |

Example 3: Liquid to Vapor Phase Change Expansion: One each of aluminum, copper and iron wires having diameters of 0.0001 meters are fed into a separate refractory tube (e.g. a silica tube) with an inner diameter just larger than the outer diameter of the wires. At least a portion of each wire is melted and maintained as a liquid proximate the end of the silica tube, so that the meniscus of the liquid is positioned at the end of the silica tube. The silica tube includes electrodes positioned just above a 100 micron silica end portion of the tube. The electrodes are attached to a current pulse generating system, such as any of the current pulse generating systems described herein. The electrodes have a dimension along the length of the tube of about 25 microns. A current pulse is transmitted through the the liquid material between the electrodes in the silica tube and vaporizes the liquid in about 5 microseconds. An end portion of the molten material between the electrodes and the tip of the silica tube remains a liquid. During heating, the expansion of the vaporized material occurs primarily along the longitudinal axis of the silica tube and forces the end portion of the liquid, or molten material, to accelerate axially so as to be ejected from the tube, thus resulting in a droplet of molten material being jetted from the tube.

For Table 3 below, the "pulse energy" refers to the energy used to vaporize a portion of the liquid as described above and could potentially be supplied by a single current pulse.

TABLE 3

| Wire/Material Properties | Units | | Al wire | Cu wire | Fe wire | Symbol or Formula |
|---|---|---|---|---|---|---|
| $T_{boil}$ | C. | | 2327 | 2595 | 2862 | |
| Density | kg/m3 | | 2700 | 8960 | 7870 | $\rho\mu$ |
| Latent heat | kJ/kg | | 11400 | 5069 | 6340 | $\Lambda$ |
| Specific latent heat | kJ/m3 | | 3.08E+07 | 4.54E+07 | 4.99E+07 | $\lambda$ |
| Mass | kg | | 5.30E−10 | 1.76E−09 | 1.55E−09 | m = rpd2l/4 |
| Diameter | m | 0.0001 | | | | d |
| Length | l | 2.5E−05 | | | | l |
| Vaporization of portion of liquid in graphite tube | | | | | | |
| Pulse length | s | 5.00E−06 | | | | tp |
| Pulse energy | J | | 6.04E−03 | 8.92E−03 | 9.80E−03 | E = mL |
| Pulse power | W | | 1.21E+03 | 1.78E+03 | 1.96E+03 | P = E/tp |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A three-dimensional ("3D") printer, comprising:
a plurality of ejector conduits arranged in an array, each ejector conduit comprising an inner conduit portion including an electrically-insulating material, and an outer conduit portion including a thermally-conducting material, each ejector conduit further comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway, wherein the ejector nozzle further comprises the electrically-insulating material positioned circumferentially-between the first and second electrodes, such that the first and second electrodes and the electrically-insulating material form a ring that defines the passageway therein, and wherein the first and second electrodes are positioned entirely in the ejector nozzle and/or at a tip of the ejector nozzle;
a current pulse generating system in electrical contact with the ejector nozzle of each of the plurality of ejector conduits, the current pulse generating system being configured to flow an electrical current between the first electrode and the second electrode, which causes the print material to thermally expand sufficiently rapidly to provide momentum to eject one or more drops of the print material from the ejector nozzle in the event the print material is positioned in the ejector nozzle, wherein the print material is supplied in a liquid phase, wherein the electrical current causes at least a portion of the print material in the liquid phase to vaporize, which provides the momentum, and wherein the 3D printer does not include a magnetic field source, an electromagnetic coil, or a magnet to cause the one or more drops of the print material to be ejected from the ejector nozzle; and
a positioning system for controlling the relative position of the array with respect to a print substrate in a manner that would allow the print substrate to receive the print material jettable from the ejector nozzle of each of the plurality of ejector conduits during operation of the 3D printer.

2. The three-dimensional printer of claim 1, wherein the first electrode and the second electrode comprise a refractory metal.

3. The three-dimensional printer of claim 2, wherein the first electrode and the second electrode further comprise a passivation coating disposed on the refractory metal.

4. The three-dimensional printer of claim 1, wherein the first electrode and the second electrode form a first electrode pair, the ejector nozzle further comprising a third electrode and a fourth electrode, at least one surface of the third electrode being exposed in the passageway and at least one surface of the fourth electrode being exposed in the passageway, the third electrode and the fourth electrode forming a second electrode pair.

5. The three-dimensional printer of claim 1, wherein the current pulse generating system further comprises a pulse control system, the pulse control system comprising a non-transitory computer readable medium, having stored thereon, instructions that when executed by a computing device, cause the computing device to perform operations comprising: determining at least one pulse characteristic chosen from a pulse amplitude and a pulse duration for a current pulse that, if flowed between the first electrode and the second electrode while electrically conducting print material is positioned in the ejector nozzle, will heat and expand the print material so as to provide sufficient momentum to eject at least a portion of the print material from the ejector nozzle onto a print substrate.

6. The three-dimensional printer of claim 1, further comprising a feeder mechanism for advancing the print material to the first end of the plurality of ejector conduits, wherein the feeder mechanism comprises a system for advancing the print material in the form of a plurality of filaments.

7. The three-dimensional printer of claim 1, further comprising a feeder mechanism for advancing the print material to the first end of the plurality of ejector conduits, wherein the feeder mechanism comprises a system for flowing the print material in liquid form.

8. The three-dimensional printer of claim 1, wherein the electrically-insulating material is a refractory material chosen from metal oxides, ceramics and combinations thereof.

9. The three-dimensional printer of claim 1, wherein the plurality of ejector conduits are supported within an ejector housing.

10. The three-dimensional printer of claim 9, wherein the plurality of ejector conduits are integral with the ejector housing.

11. The three-dimensional printer of claim 9, wherein the ejector housing comprises at least one housing material chosen from metals, ceramics, metal oxides, high temperature polymers and combinations thereof.

12. The three-dimensional printer of claim 9, further comprising a heater mechanism for heating at least a portion of the ejector housing surrounding the ejector conduits during operation of the 3D printer, the heater mechanism being separate from the current pulse generating system.

13. The three-dimensional printer of claim 1, wherein the ejector nozzle has an inner width ranging from about 10 microns to about 1000 microns.

14. The three-dimensional printer of claim 1, wherein the ejector nozzle has an inner width ranging from about 10 microns to about 100 microns.

15. The three-dimensional printer of claim 1, wherein the array has M columns of ejector conduits arranged on an X axis and N rows of ejector conduits arranged on a Y axis, where M is an integer ranging from 2 to about 1000 and N is an integer ranging from 1 to 2.

16. The three-dimensional printer of claim 15, where M is an integer ranging from about 100 to about 1000.

17. The three-dimensional printer of claim 16, wherein N is 2 and the rows of the ejector conduits are arranged linearly, the ejector conduits in each row being staggered with respect to ejector conduits of the adjacent row.

18. A printer jetting mechanism, comprising:
a plurality of ejector conduits arranged in an array, each ejector conduit comprising an inner conduit portion including an electrically-insulating material, and an outer conduit portion including a thermally-conducting material, each ejector conduit further comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode and a second electrode, at least one surface of the first electrode being exposed in the passageway and at least one surface of the second electrode being exposed in the passageway, wherein the ejector nozzle further comprises the electrically-insulating material positioned circumferentially-between the first and second electrodes, such that the first and second electrodes and the electrically-insulating material form a ring that defines the passageway therein, and wherein the first and second electrodes are positioned entirely in the ejector nozzle and/or at a tip of the ejector nozzle; and
a current pulse generating system in electrical contact with the ejector nozzle of each of the plurality of ejector conduits, the current pulse generating system being configured to flow an electrical current between the first electrode and the second electrode, which causes the print material thermally to expand sufficiently rapidly to provide momentum to eject one or more drops of the print material from the ejector nozzle in the event the print material is positioned in the ejector nozzle, wherein the printer jetting mechanism does not include a magnetic field source, an electromagnetic coil, or a magnet to cause the one or more drops of the print material to be ejected from the ejector nozzle.

19. The printer jetting mechanism of claim 18, wherein the first electrode and the second electrode comprise a refractory metal.

20. The printer jetting mechanism of claim 18, wherein the current pulse generating system further comprises a pulse control system, the pulse control system comprising a non-transitory computer readable medium, having stored thereon, instructions that when executed by a computing device, cause the computing device to perform operations comprising: determining at least one pulse characteristic chosen from a pulse amplitude and a pulse duration for a current pulse that, if flowed between the first electrode and the second electrode while electrically conducting print material is positioned in the ejector nozzle, will heat and expand the print material so as to provide sufficient momentum to eject at least a portion of the print material from the ejector nozzle onto a print substrate.

21. A three-dimensional ("3D") printer jetting mechanism, comprising:
a plurality of ejector conduits arranged in an array, each ejector conduit comprising an inner conduit portion including an electrically-insulating material, and an outer conduit portion including a thermally-conducting material, each ejector conduit further comprising a first end positioned to accept a print material, a second end comprising an ejector nozzle, and a passageway defined by an inner surface of the ejector conduit for allowing the print material to pass through the ejector conduit from the first end to the second end, the ejector nozzle comprising a first electrode, a second electrode and an electrically-insulating material disposed circumferentially between the first electrode and the second electrode, such that the first and second electrodes and the electrically-insulating material form a ring that defines the passageway therein, wherein the first and second electrodes are positioned entirely in the ejector nozzle and/or at a tip of the ejector nozzle, at least one surface of the first electrode being exposed in the passageway and at least one surface of the second electrode being exposed in the passageway, wherein the first and second electrodes are configured to have an electrical current flow therebetween, which causes the print material to thermally expand sufficiently rapidly to provide momentum to eject one or more drops of the print material from the ejector nozzle, and wherein the 3D printer jetting mechanism does not include a magnetic field source, an electromagnetic coil, or a magnet to cause the one or more drops of the print material to be ejected from the ejector nozzle.

22. The three-dimensional printer of claim 1, wherein a single pulse of the electrical current causes the print material to thermally expand sufficiently rapidly to provide momentum to eject the one or more drops of the print material from the ejector nozzle.

23. The three-dimensional printer of claim 1, wherein the print material comprises a solid filament, and wherein the electrical current causes the solid filament to undergo a phase change and thermally expand sufficiently rapidly to provide momentum to eject the one or more drops of the print material from the ejector nozzle.

24. The three-dimensional printer of claim 23, further comprising a biasing member configured to exert a force on the first electrode, the solid filament, or both, which causes the first electrode and the solid filament to be in contact with one another.

25. The three-dimensional printer of claim 1, wherein the outer conduit portion comprises:
  a first outer conduit portion that surrounds an upper region of the inner conduit portion, wherein the first outer conduit portion includes a first thermally conducting material; and
  a second outer conduit portion that surrounds a lower region of the inner conduit portion, wherein the second outer conduit is thinner than the first outer conduit portion, wherein the second outer conduit portion includes a second thermally conducting material that is different than the first thermally conducting material, and wherein the second outer conduit portion is thinner than the first outer conduit portion.

26. The three-dimensional printer of claim 1, wherein the passageway has a first width at the first end, wherein the first width is wider than an inner width of the ejector nozzle, and wherein the passageway tapers from the first width to the inner width.

27. The three-dimensional printer of claim 1, wherein the ejector conduits each include a vent to allow air or other ambient gases to flow into the ejector conduits.

28. The three-dimensional printer of claim 27, wherein the vent comprises a groove on an inner surface of the ejector nozzle.

29. The three-dimensional printer of claim 27, wherein the vent is sized such that a surface tension of the print material does not allow the print material to flow into the vent, and wherein the vent is also sized such that the air or other ambient gases flow through the vent and into the ejector nozzle.

30. The three-dimensional printer of claim 27, wherein a width or length of the vent is ten or more times smaller than an inner diameter of the ejector nozzle.

31. The three-dimensional printer of claim 1, the current pulse generating system is configured to flow the electrical current between the first electrode and the second electrode, which causes a first portion of the print material between the first and second electrodes to vaporize and to thermally expand sufficiently rapidly to provide momentum to eject the one or more drops of a second portion of the print material from the ejector nozzle in the event the print material is positioned in the ejector nozzle, wherein the second portion of the print material is between the first portion of the print material and a tip of the ejector nozzle, and wherein the second portion remains a liquid.

* * * * *